(12) United States Patent
Tsuzuki et al.

(10) Patent No.: US 10,030,118 B2
(45) Date of Patent: Jul. 24, 2018

(54) POLYACETAL RESIN MOLDED ARTICLE

(71) Applicant: ASAHI KASEI KABUSHIKI KAISHA, Tokyo (JP)

(72) Inventors: Junichi Tsuzuki, Tokyo (JP); Takaaki Miyoshi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/512,683

(22) PCT Filed: Oct. 16, 2014

(86) PCT No.: PCT/JP2014/077622
§ 371 (c)(1),
(2) Date: Mar. 20, 2017

(87) PCT Pub. No.: WO2016/059711
PCT Pub. Date: Apr. 21, 2016

(65) Prior Publication Data
US 2017/0283583 A1  Oct. 5, 2017

(51) Int. Cl.
*C08K 5/20* (2006.01)
*C08K 5/11* (2006.01)
*C08K 3/22* (2006.01)
*C08L 59/04* (2006.01)
*C08K 5/101* (2006.01)

(52) U.S. Cl.
CPC ............... *C08K 5/11* (2013.01); *C08K 3/22* (2013.01); *C08K 5/101* (2013.01); *C08K 5/20* (2013.01); *C08L 59/04* (2013.01); *C08K 2003/2237* (2013.01); *C08K 2003/2265* (2013.01); *C08K 2003/2296* (2013.01)

(58) Field of Classification Search
CPC .... C08K 5/11; C08K 3/22; C08K 5/20; C08L 59/04
See application file for complete search history.

(56) References Cited

U.S. PATENT DOCUMENTS

| | | | | |
|---|---|---|---|---|
| 4,079,100 A | * | 3/1978 | Gergen | ............... C08L 23/02 525/154 |
| 2001/0040769 A1 | | 11/2001 | Takami | |
| 2002/0016395 A1 | | 2/2002 | Niino et al. | |
| 2005/0088782 A1 | | 4/2005 | Horio et al. | |
| 2006/0052492 A1 | * | 3/2006 | Harashina | ............ C08K 5/3492 524/100 |
| 2007/0129484 A1 | * | 6/2007 | Horio | ............... C08L 51/06 524/505 |
| 2008/0037175 A1 | | 2/2008 | Horio et al. | |
| 2009/0298981 A1 | * | 12/2009 | Nagai | ............... C08J 3/20 524/261 |
| 2011/0092642 A1 | * | 4/2011 | Kurihara | ............... C08L 69/00 524/606 |
| 2011/0237727 A1 | | 9/2011 | Chang et al. | |
| 2015/0294750 A1 | * | 10/2015 | Inagaki | ............... C08K 3/04 252/511 |

FOREIGN PATENT DOCUMENTS

| | | |
|---|---|---|
| JP | 2001-297548 A | 10/2001 |
| JP | 2006-063107 A | 3/2006 |
| JP | 2008-214471 A | 9/2008 |
| JP | 2011-208114 A | 10/2011 |
| JP | 4813403 B2 | 11/2011 |
| JP | 2013-082818 A | 5/2013 |
| JP | 2013-112708 A | 6/2013 |
| WO | 2001/009213 A1 | 2/2001 |
| WO | 2003-055945 A1 | 7/2003 |
| WO | 2005-116137 A1 | 12/2005 |

OTHER PUBLICATIONS

European Search Report issued with respect to Application No. 14903973.7 dated Jul. 12, 2017.
International Search Report issued with respect to Application No. PCT/JP2014/077622, dated Dec. 22, 2014.
International Preliminary Report on Patentability issued with respect to Application No. PCT/JP2014/077622, dated Apr. 18, 2017.

* cited by examiner

Primary Examiner — Hannah J Pak
(74) Attorney, Agent, or Firm — Greenblum & Bernstein, P.L.C.

(57) ABSTRACT

The resin molded article of the present invention comprises (B) 0.1 to 5 parts by mass of a sliding agent having a weight average molecular weight of 10,000 or less, and (C) 0.01 to 3 parts by mass of a coloring agent, based on (A) 100 parts by mass of a polyacetal resin, wherein a relative element concentration ratio between carbon and oxygen on a surface thereof [C/O] (atomic %) is 1.01 to 2.50.

8 Claims, No Drawings

POLYACETAL RESIN MOLDED ARTICLE

TECHNICAL FIELD

The present invention relates to a polyacetal resin molded article.

BACKGROUND ART

Polyacetal resin has an excellent balance among mechanical strength, chemical resistance, sliding properties and abrasion resistance, and also, it is easily processed. Accordingly, polyacetal resin has been used as a typical engineering plastic in a broad range including mechanism elements of electric equipment, automobile components, and other mechanism elements.

When the polyacetal resin is selected for these intended uses, the most important thing is good sliding properties of the polyacetal resin. For example, in the case of a printer gear or a window motor gear for cars, rubbing against (friction with) other materials takes place under conditions of relatively high load (approximately 10 to 20 N of load). At that time, it is important for the polyacetal resin to have high sliding properties by which it is not abraded, or quietness by which it causes a little rubbing noise or creaking noise.

For the purpose of improving abrasion resistance or quietness under such a high load, for example, Patent Literature 1 proposes a technique of adding an ester compound as a sliding agent to the polyacetal resin, and Patent Literature 2 proposes a technique of adding polyolefin as a sliding agent to the polyacetal resin. Further, Patent Literature 3 proposes a technique of adding an elastomer and a sliding agent to the polyacetal resin, and the like.

On the other hand, for example, as described in Patent Literature 4, the polyacetal resin has been recently used in a component called "lamp" in hard disk drive.

This component called lamp is a component used for a slider head serving as a reading/writing part to evacuate from the hard disk, when reading/writing into the hard disk is in a non-working state.

When the slider head goes in and out the lamp, the tab on the edge of the head rubs against the inclined portion of the lamp. The load during the rubbing is very small (a load of approximately 0.05 N or less).

There are many cases where the aforementioned material having high sliding properties under a high load (a load of approximately 10 to 20 N) cannot be directly applied as a material under a very small load (a load of 0.05 N or less), nor vice versa. For instance, when a material that has excellent sliding properties in a gear is applied to a lamp component, it does not always provide a component having good performance.

From such a viewpoint, materials have been developed so far for use in hard disk lamp components. For example, Patent Literatures 5 and 6 each propose a resin composition prepared by adding a polymer lubricant having a weight average molecular weight of more than 10,000, such as polyolefin, to the polyacetal resin as a suitable material for hard disk lamp components.

CITATION LIST

Patent Literature

Patent Literature 1: Japanese Patent Laid-Open No. 2001-297548

Patent Literature 2: Japanese Patent No. 4813403

Patent Literature 3: Japanese Patent Laid-Open No. 2013-82818

Patent Literature 4: International Publication No. WO 2005/116137

Patent Literature 5: International Publication No. WO 2003/055945

Patent Literature 6: Japanese Patent Laid-Open No. 2006-63107

SUMMARY OF INVENTION

Technical Problem

The principal intended use of the recent hard disk has been changed from the previous equipping of the hard disk into personal computers to the equipping of the hard disk into a high-volume server corresponding to cloud computing, a mobile-type hard disk drive (HDD) cassette (iVDR), etc.

As such, new requirements have appeared from the viewpoints of an increase in the conserved data amount, an increase in the number of access to the hard disk, and the ensuring of high reliability, such as prevention of malfunction caused by vibration or impact.

Specifically, higher abrasion resistance, which is two times or more higher than the conventional abrasion resistance (in reality, sliding properties of enduring more than 1,000,000 times of rubbing), has been required for a resin constituting a lamp component.

In order to respond to this requirement characteristic, it is necessary to use a molded article, on which a special surface layer is formed. A molded article having such a special surface layer could not be obtained by prior art techniques.

Hence, it is an object of the present invention to provide a molding article having a special surface layer, which has extremely high sliding characteristics, such as a reduction in the abrasion loss under a very small load.

Solution to Problem

The present inventors have conducted intensive studies directed towards achieving the aforementioned object. As a result, the inventors have found that the aforementioned object can be achieved by a polyacetal resin molded article comprising a polyacetal resin, a specific sliding agent and a coloring agent in specific amounts, and having a specific surface condition, thereby completing the present invention.

Specifically, the present invention is as follows.

[1]

A resin molded article comprising (B) 0.1 to 5 parts by mass of a sliding agent having a weight average molecular weight of 10,000 or less, and (C) 0.01 to 3 parts by mass of a coloring agent, based on (A) 100 parts by mass of a polyacetal resin, wherein the relative element concentration ratio between carbon and oxygen on the surface thereof [C/O] (atomic %) is 1.01 to 2.50.

[2]

The resin molded article according to [1], wherein a peak intensity ratio (C—O/C=O) between a C—O stretching vibration peak and a C=O stretching vibration peak on a surface thereof, which is obtained by infrared spectroscopy, is 10 to 200.

[3]

The resin molded article according to [1] or [2], wherein (A) a polyacetal resin comprises a block copolymer.

[4]
The resin molded article according to [3], wherein the block copolymer is an ABA-based block copolymer.

[5]
The resin molded article according to any of [1] to [4], wherein (B) the sliding agent having the weight average molecular weight of 10,000 or less is at least one compound selected from the group consisting of alcohol, amine, carboxylic acid, an ester, an amide compound consisting of monovalent or divalent amine and carboxylic acid, and wax.

[6]
The resin molded article according to any of [1] to [5], wherein a melting point of (B) the sliding agent having the weight average molecular weight of 10,000 or less is 40° C. to 150° C.

[7]
The resin molded article according to any of [1] to [6], wherein an abundance of a particle having a major axis of 10 μm or more in (C) the coloring agent is 0.05 or less.

[8]
The resin molded article according to any of [1] to [7], wherein (C) the coloring agent comprises at least one metal oxide selected from the group consisting of iron, zinc, and titanium.

[9]
The resin molded article according to any of [1] to [8], comprising (D) 0.01 to 5 parts by mass of a polyolefin resin based on (A) 100 parts by mass of the polyacetal resin.

[10]
The resin molded article according to [9], wherein (D) the polyolefin resin is at least one selected from the group consisting of (i) polyethylene, (ii) polypropylene, (iii) an ethylene-α-olefin copolymer, (iv) an ethylene-acrylic acid ester copolymer in which the content of the acrylic acid ester unit is 5% to 30% by mass, (v) a block polymer having a structure in which a block of polyolefin (d1) and a block of a hydrophilic polymer (d2) are repeatedly and alternatively bound to one another via at least one bond selected from the group consisting of an ester bond, an amide bond, an ether bond, a urethane bond, and an imide bond, and (vi) a modified product thereof.

Advantageous Effects of Invention

According to the present invention, it becomes possible to provide a molding article having a special surface layer, which has extremely high sliding characteristics, such as a reduction in the abrasion loss under a very small load. This molded article is suitable for lamp components of hard disk, internal components used in watches and the like, etc., which are required to have abrasion resistance under a very small load.

DESCRIPTION OF EMBODIMENTS

Hereinafter, the mode for carrying out the present invention (hereinafter referred to as "the present embodiment") will be described in detail. However, the present invention is not limited to the following descriptions, and it can be modified in various ways and can be carried out in the scope of the gist thereof.

<<Resin Molded Article>>
The resin molded article in the present embodiment (hereinafter also referred to as a "polyacetal resin molded article") means a molded article obtained by molding the after-mentioned polyacetal resin composition according to various types of methods, such as injection molding, extrusion molding, inflation molding, or blow molding.

The resin molded article of the present embodiment has extremely high sliding characteristics, such that the abrasion loss is small under a very small load.

As described above, it is considered that it is difficult to achieve both sliding properties under a high load and sliding properties under a very small load, because the thickness of a resin from the surface layer thereof, which is worn and broken by sliding, is different.

Specifically, by sliding under a high load, the resin is worn and broken to a relatively deep place that is at several tens of μm from the surface layer at an initial stage. On the other hand, by sliding under a very small load, such wearing or breaking occurs up to only the surface layer (for example, a depth of approximately several μm).

The resin molded article of the present embodiment has the effect of suppressing the wearing and breaking of only the surface layer, and it also becomes possible to maintain this effect until after completion of 1,000,000 times of rubbing.

It is considered that the resin molded article of the present embodiment has such an effect because it has a special surface layer.

The special surface layer used in the present embodiment is a surface layer, in which the relative element concentration ratio [C/O] (atomic %) between carbon and oxygen on the surface of the molded article (hereinafter also abbreviated as a "C/O ratio") is 1.01 to 2.50. The relative element concentration ratio [C/O] can be measured by the after-mentioned method.

In general, in the case of using a polyacetal resin alone, the C/O ratio is 1.00 based on the constituent element ratio. If various sliding agents are added to the polyacetal resin, the C/O ratio on the surface layer is changed. Examples of a commonly used sliding agent include ester-based compounds and amide-based compounds, which have a relatively low molecular weight, and high molecular weight sliding agents such as polyolefin. Only by mixing such a sliding agent into the polyacetal resin according to an ordinary method, the C/O ratio cannot be regulated to be in the range of 1.01 to 2.50.

Specifically, for example, if an ester-based compound or an amide compound, which has a relatively low molecular weight, is simply mixed into a polyacetal resin without any special devices, a large amount of such an ester-based compound or amide-based compound bleeds out on the surface layer of a molded article, and as a result, the C/O ratio on the surface layer largely exceeds 2.5. In this case, the abrasion resistance of the obtained molded article under a very small load (hereinafter also abbreviated as "very small load abrasion resistance") is improved at an early stage because of the bleed-out sliding agent. However, after such a bleed-out product has been removed by sliding, the aforementioned abrasion resistance tends to be drastically deteriorated.

Moreover, in a case where not a low molecular weight ester-based compound or amide compound, but a high molecular weight sliding agent, such as polyolefin, is used alone as a sliding agent, the C/O ratio on the surface layer thereof becomes the same as that of the polyacetal resin (1.00). This is considered because such a high molecular weight sliding agent is present only at a depth from several μm to 10 μm from the surface layer. This means that the high molecular weight sliding agent is not exposed to the surface. In this case, the very small load abrasion resistance becomes deteriorated from the initial stage of sliding, and thus, it cannot respond to a novel requirement that is rubfastness that is resistance to more than 1,000,000 times of scraping movements.

On the other hand, in the resin molded article of the present embodiment, by using a sliding agent having a weight average molecular weight of 10,000 or less, by adding the sliding agent and a coloring agent in specific amounts with respect to a polyacetal resin, and further by selecting, for example, molding conditions or the type of the polyacetal resin, as appropriate, the C/O ratio is regulated in the range of 1.01 to 2.50. Preferred molding conditions or the preferred type of the polyacetal resin will be described later.

An example of a method of measuring the C/O ratio value in the present embodiment will be given below.

The C/O ratio on the surface of the molded article can be easily obtained by measuring the surface of the resin molded article using a high-performance X-ray photoelectron spectrometer (which is generally referred to as "XPS"). Such an analysis device is commonly used, and an example of the device is ESCALAB250 manufactured by Thermo Fisher Scientific K. K.

As an excitation source upon the measurement, monoAlKα or the like is preferably used.

Furthermore, in order to eliminate the influence of contaminants attached to the surface of the molded article, the surface of the molded article is subjected to ultrasonic cleaning using a cleaning agent (e.g., an aqueous solution of VALTRON DP97031), is then washed with pure water, and is then dried in an oven or the like.

The C concentration in the XPS measurement is defined as a peak area in the peak top range from 284 eV to 288 eV, the O concentration is defined as a peak area in the peak top range from 530 eV to 536 eV, and a relative element concentration can be calculated from the ratio of individual peak areas.

The C/O ratio on the surface of the resin molded article of the present embodiment is used as an indicator for the bleed-out amount of a sliding agent constituting the present resin molded article, as described later. The upper limit of the C/O ratio on the surface of the resin molded article of the present embodiment is 2.50, and the lower limit thereof is 1.01.

For example, if a large amount of sliding agent bleeds out on the surface of a lamp molded article, the bleed-out product is attached to, accumulated on, and dropped on a tab that slides on the surface, and it causes a reading failure to a hard disk. Thus, it is not favorable. By setting the upper limit of the C/O ratio on the surface of the resin molded article at 2.50, a good resin molded article, in which the aforementioned inconvenience is suppressed, can be obtained.

The upper limit of the C/O ratio on the surface of the resin molded article is more preferably 2.30, even more preferably 2.00, further preferably 1.90, and particularly preferably 1.80.

The lower limit of the C/O ratio on the surface of the resin molded article is 1.01, and this value indicates a state in which bleeding out occurs in an extremely small amount, namely, it is very close to the surface layer of the polyacetal itself. The lower limit of the C/O ratio is preferably 1.03, more preferably 1.05, further preferably 1.08, and particularly preferably 1.10.

As an example of a more preferred surface layer for realizing the molded article having a special surface layer according to the present embodiment, the peak intensity ratio (=C—O/C=O) between a C—O stretching vibration peak and a C=O stretching vibration peak on the surface thereof, which is obtained by infrared spectroscopy, is 10 to 200.

A method for obtaining the value of the peak intensity ratio according to the present embodiment between a C—O stretching vibration peak and a C=O stretching vibration peak on the surface of a molded article which is obtained by infrared spectroscopy (hereinafter simply abbreviated as a "peak intensity ratio (C—O/C=O)," at times) will be described below.

The peak intensity ratio (C—O/C=O) on the surface of a resin molded article can be easily obtained by performing a measurement and an analysis according to an attenuated total reflection method (ATR method) using an infrared spectrophotometer. As such a measurement device, commercially available Spectrum One manufactured by Perkin-Elmer, etc. can be used.

The ATR method is a measurement method for obtaining information regarding a surface condition by utilizing the phenomenon in which infrared light entering into a crystal that has been allowed to come into contact with a resin molded article is absorbed into the surface of the resin molded article, while it reflects in the crystal several times. At this time, on the surface of the molded article, a phenomenon called evanescent wave takes place, and infrared ray permeates into the molded article. The depth is approximately several μm, although it is somewhat different depending on wavelength or the type of the crystal. That is to say, the peak intensity ratio (C—O/C=O) on the surface of the resin molded article, which is measured and analyzed by the attenuated total reflection method (ATR method) using an infrared spectrophotometer, indicates information regarding the depth that is several μm from the surface layer of the molded article. In the present embodiment, the crystal used in the ATR method is preferably diamond/ZnSe from the viewpoint of deep permeation.

The obtained spectrum is analyzed as an absorbance ratio. Specifically, a peak intensity (peak height) from 1040 cm$^{-1}$ to 1160 cm$^{-1}$ is calculated as a signal of C—O (derived from the repeating structure of polyacetal), and a peak intensity from 1600 cm$^{-1}$ to 1750 cm$^{-1}$ is calculated as a signal of C=O. Then, the peak intensity ratio (C—O/C=O) is defined as a peak intensity ratio (C—O/C=O) on the surface of the resin molded article. At this time, in order to eliminate errors, as baselines upon obtaining the peak intensity, a straight line is drawn from 1040 cm$^{-1}$ to 1160 cm$^{-1}$, and from 1590 cm$^{-1}$ to 1760 cm$^{-1}$, respectively, and the height from the baseline is then read out as a peak intensity.

The peak intensity ratio (C—O/C=O) on the surface of the resin molded article of the present embodiment means an indicator for the amount of the after-mentioned sliding agent constituting the present resin molded article that is present close to the surface layer (within several μm in depth). The present peak intensity ratio (C—O/C=O) is preferably 10 to 200. The value of the peak intensity ratio that exceeds 200 indicates that the after-mentioned sliding agent constituting the present resin molded article is hardly present close to the surface layer. On the other hand, the value that is less than 10 indicates that an extremely large amount of sliding agent is unevenly distributed close to the surface layer. From the viewpoints of maintaining high sliding properties at a number of more than 1,000,000 times of rubbing and suppressing deterioration of abrasion resistance by peeling of the surface layer, the peak intensity ratio (C—O/C=O) on the surface of the resin molded article is preferably set between 10 and 200.

The upper limit of the peak intensity ratio (C—O/C=O) on the surface of the resin molded article according to the present embodiment is more preferably 180, further preferably 150, and particularly preferably 140. On the other hand, the lower limit of the peak intensity ratio (C—O/C=O) on the surface of the resin molded article is more preferably 15, further preferably 20, and particularly preferably 25.

The resin molded article of the present embodiment comprises (B) 0.1 to 5 parts by mass of a sliding agent having a weight average molecular weight of 10,000 or less, and (C) 0.01 to 3 parts by mass of a coloring agent, based on (A) 100 parts by mass of a polyacetal resin.

Individual components constituting the resin molded article of the present embodiment will be described in detail.

<<(A) Polyacetal Resin>>

Herein, (A) a polyacetal resin (which may also be referred to as "component (A)" or "(A)" in the present description), which can be used in the resin molded article of the present embodiment, will be described in detail.

Examples of (A) the polyacetal resin, which can be used in the present embodiment, include a polyacetal homopolymer and a polyacetal copolymer.

Specific examples of (A) the polyacetal resin include: a polyacetal homopolymer substantially consisting of only an oxymethylene unit, which is obtained by homopolymerization of a formaldehyde cyclic oligomer, such as a formaldehyde monomer, or a trimer (trioxane) or a tetramer (tetraoxane) thereof; and a polyacetal copolymer obtained by copolymerization of a formaldehyde cyclic oligomer, such as a formaldehyde monomer, or a trimer (trioxane) or a tetramer (tetraoxane) thereof, with cyclic ethers or cyclic formals, such as cyclic formal of glycol or diglycol, such as ethylene oxide, propylene oxide, epichlorohydrin, 1,3-dioxolane, or 1,4-butanediolformal.

Moreover, a polyacetal copolymer having a branch, which is obtained by copolymerization of a formaldehyde monomer and/or a formaldehyde cyclic oligomer with a monofunctional glycidyl ether, and a polyacetal copolymer having a crosslinked structure, which is obtained by copolymerization of a formaldehyde monomer and/or a formaldehyde cyclic oligomer with a polyfunctional glycidyl ether, can also be used as polyacetal copolymers.

Furthermore, a block copolymer having a block that is different from the repeating structure unit of polyacetal may also be used.

The block copolymer can selectively and stably comprise, in the different block portion thereof, a sliding agent having a weight average molecular weight of 10,000 or less that constitutes the resin molded article of the present embodiment. Thereby, it becomes possible to achieve stable abrasion resistance to more than 1,000,000 times of sliding.

The block copolymer is used herein to preferably mean an acetal homopolymer or an acetal copolymer (hereinafter, the two copolymers are collectively referred to as a "block copolymer" at times), which has at least a block portion represented by any one of the following general formulae (1), (2) and (3):

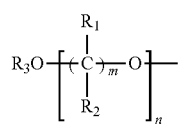 (1)

 (2)

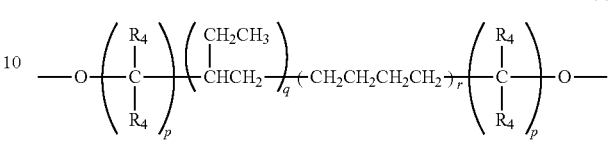 (3)

In the formulae (1) and (2), $R_1$ and $R_2$ each independently represent one of chemical species selected from the group consisting of a hydrogen atom, an alkyl group, a substituted alkyl group, an aryl group, and a substituted aryl group, and a plurality of $R_1$ and $R_2$ may be identical to or different from one another. In addition, $R_3$ represents one of chemical species selected from the group consisting of an alkyl group, a substituted alkyl group, an aryl group, and a substituted aryl group. The character m represents an integer of 1 to 6, and preferably an integer of 1 to 4. The character n represents an integer of 1 to 10000, and preferably an integer of 10 to 2500. The group represented by the above general formula (1) is a residue formed by removing a hydrogen atom from an alkylene oxide adduct of alcohol, and the group represented by the above general formula (2) is a residue formed by removing a hydrogen atom from an alkylene oxide adduct of carboxylic acid. The polyacetal homopolymer having the above described block component can be prepared, for example, by the method described in Japanese Patent Laid-Open No. 57-31918.

In the formula (3), $R_4$ represents one of chemical species selected from the group consisting of a hydrogen atom, an alkyl group, a substituted alkyl group, an aryl group, and a substituted aryl group, and a plurality of $R_4$ may be identical to or different from one another. In addition, the character p represents an integer of 2 to 6, and two p may be identical to or different from each other. The characters q and r each represent a positive number, and q is used in an amount of 2 to 100 mol % and r is used in an amount of 0 to 98 mol %, based on the total amount of q and r (100 mol %). The unit —(CH(CH$_2$CH$_3$)CH$_2$)— and the unit —(CH$_2$CH$_2$CH$_2$CH$_2$)— are each present randomly or as a block.

The block portions of these block copolymers represented by the formulae (1) to (3) are obtained by allowing a compound constituting a block having a functional group such as a hydroxyl group at both termini or either one terminus, to react with the terminal portion of polyacetal in the polymerization process.

The amount of the block component represented by the above formula (1), (2) or (3) inserted into the block copolymer is not particularly limited, and it is preferably 0.001% by mass to 30% by mass based on 100% by mass of the block copolymer.

The upper limit of the inserted amount of the block component is more preferably 15% by mass, further preferably 10% by mass, and particularly preferably 8% by mass. On the other hand, the lower limit of the inserted amount of the block component is more preferably 0.01% by mass, further preferably 0.1% by mass, and particularly preferably 1% by mass.

From the viewpoint of suppressing a reduction in the rigidity of the resin molded article, the inserted amount of the block component is preferably set at 30% by mass or less. From the viewpoint of continuously maintaining stable sliding properties, the inserted amount of the block component is preferably 0.001% by mass or more.

Moreover, from the viewpoint of suppressing a reduction in the rigidity of the resin molded article, the molecular weight of the block component in the block copolymer is preferably 10000 or less, more preferably 8000 or less, and further preferably 5000 or less. The lower limit of the molecular weight of the block component is not particularly limited. From the viewpoint of continuously maintaining stable sliding properties, the lower limit of the molecular weight is preferably 100 or more.

The compound that forms the block component in the block copolymer is not particularly limited. Specific examples of such a compound include $C_{18}H_{37}O(CH_2CH_2O)_{40}C_{18}H_{37}$, $C_{11}H_{23}CO_2(CH_2CH_2O)_{30}H$, $O_{18}H_{37}O(CH_2CH_2O)_{70}H$, $O_{18}H_{37}O(CH_2CH_2O)_{40}H$, and hydrogenated polybutadiene, both termini of which are hydroxyalkylated.

Regarding coupling form, the above described block copolymer is preferably an ABA-based block copolymer.

Herein, the ABA-based block copolymer is a block copolymer having the block represented by the formula (3), and specifically, it means a block copolymer, in which a polyacetal segment A (hereinafter also referred to as "A") and a hydrogenated polybutadiene segment B (hereinafter also referred to as "B"), both termini of which are hydroxyalkylated, are configured in the order of A-B-A.

The block component represented by the above formula (1), formula (2) or formula (3) may have an unsaturated bond with an iodine number of 20 $g-I_2/100$ g or less. The unsaturated bond is not particularly limited, and an example of the unsaturated bond is a carbon-carbon double bond.

An example of the polyacetal copolymer having the above described block component is the polyacetal block copolymer disclosed in International Publication No. WO 01/09213, and this polyacetal copolymer can be prepared by the method described in the aforementioned international publication.

By using the ABA-based block copolymer as a block copolymer, it is likely that the sliding agent having a weight average molecular weight of 10,000 or less that constitutes the resin molded article of the present embodiment can be more stably, finely dispersed, and it is also likely that a dispersed phase comprising a large amount of sliding agent can be present close to the surface layer, and further, it is likely that higher abrasion resistance to more than 1,000,000 times of sliding can be stably exhibited to the last.

As (A) a polyacetal resin that constitutes the resin molded article of the present embodiment, any one of a polyacetal homopolymer, a polyacetal copolymer, a polyacetal copolymer having a crosslinked structure, a homopolymer-based block copolymer having a block portion, and a copolymer-based block copolymer having a block component can be used, and naturally, these can be used in combination.

Moreover, as (A) a polyacetal resin, for example, a combination of copolymers each having a different molecular weight, a combination of polyacetal copolymers each having different amounts of comonomers, etc. can be used, as appropriate.

Among these, in the present embodiment, (A) the polyacetal resin preferably comprises a block copolymer. By allowing the resin molded article to comprise a block copolymer as (A) a polyacetal resin, it is likely that the resin molded article can achieve both rigidity and stable abrasion resistance to more than 1,000,000 times of sliding.

The preferred ratio of the block copolymer in (A) the polyacetal resin is preferably 5% by mass to 95% by mass or more, based on 100% by mass of (A) the polyacetal resin as a whole. The upper limit of the ratio of the block copolymer is more preferably 90% by mass, further preferably 80% by mass, and particularly preferably 75% by mass. On the other hand, the lower limit of the ratio of the block copolymer is more preferably 10% by mass, further preferably 20% by mass, and particularly preferably 25% by mass.

It is to be noted that the ratio of the present block copolymer in the resin molded article of the present embodiment can be measured by $^1$H-NMR, $^{13}$C-NMR, etc.

<<(B) Sliding Agent with Weight Average Molecular Weight of 10,000 or Less>>

Next, (B) a sliding agent having a weight average molecular weight of 10,000 or less (which may also be referred to as "component (B)" or "(B)" in the present description), which can be used in the resin molded article of the present embodiment, will be described in detail.

In the present embodiment, the sliding agent means a substance having the effect of reducing friction when it is mixed into the resin composition.

The component (B) used in the present embodiment is comprised in an amount of 0.1 to 5 parts by mass, based on 100 parts by mass of the component (A). By setting the amount of the component (B) at 0.1 part by mass or more based on 100 parts by mass of the component (A), the sliding properties of the resin molded article tend to be improved. On the other hand, by setting the amount of the component (B) at 5 parts by mass or less, it becomes possible to suppress peeling of the layer from the resin molded article.

The lower limit amount of the component (B) is preferably 0.3 parts by mass, more preferably 0.5 parts by mass, and particularly preferably 1.0 part by mass, based on 100 parts by mass of the component (A). On the other hand, the upper limit amount of the component (B) is preferably 4.5 parts by mass, more preferably 4 parts by mass, and particularly preferably 3 parts by mass, based on 100 parts by mass of the component (A).

The weight average molecular weight of the sliding agent as a component (B) constituting the resin molded article of the present embodiment is set at 10,000 or less. In the present embodiment, since the existing state of a sliding agent component close to the surface layer has a great influence on sliding characteristics, the weight average molecular weight of the component (B) is important. That is, the resin molded article of the present embodiment comprises, as a component (B), a sliding agent having a weight average molecular weight of 10,000 or less, so that it can maintain abrasion resistance at a number of more than 1,000,000 times of sliding.

The lower limit of the weight average molecular weight of the component (B) used in the present embodiment is not particularly limited. In terms of easy handleability, it is approximately 300. On the other hand, the upper limit of the weight average molecular weight of the component (B) is preferably 8000, more preferably 5000, further preferably 4000, and particularly preferably 3000.

It is to be noted that, in the present embodiment, the weight average molecular weight of the component (B) is measured by liquid chromatograph/mass spectrometry, when the weight average molecular weight is 1000 or less, and that when the weight average molecular weight is greater than 1000, it is indicated as a weight average molecular weight of polystyrene standards, as measured by gel permeation chromatography.

Subsequently, examples of (B) the sliding agent having a weight average molecular weight of 10,000 or less according to the present embodiment are given below. However, the examples are not limited thereto.

Examples of the component (B) include compounds having a structure represented by the following general formula (4), (5) or (6).

$$[R_{11}\text{-}(A_1\text{-}R_{12})_x\text{-}A_2\text{-}R_{13}]_y \qquad (4)$$

$$A_3\text{-}R_{11}\text{-}A_4 \qquad (5)$$

$$R_{14}\text{-}A_5 \qquad (6)$$

Herein, in the formulae (4) and (5), $R_{11}$, $R_{12}$ and $R_{13}$ each independently represent an alkylene group containing 1 to 30 carbon atoms, a substituted or unsubstituted alkylene group containing 1 to 30 carbon atoms, at least one hydrogen atom of which is substituted with an aryl group containing 6 to 20 carbon atoms, an arylene group containing 6 to 20 carbon atoms, or an arylene group containing 6 to 20 carbon atoms, at least one hydrogen atom of which is substituted with a substituted or unsubstituted alkyl group containing 1 to 30 carbon atoms.

In addition, in the formula (6), $R_{14}$ represents an alkyl group containing 1 to 30 carbon atoms, a substituted or unsubstituted alkyl group containing 1 to 30 carbon atoms, at least one hydrogen atom of which is substituted with an aryl group containing 6 to 20 carbon atoms, or an aryl group containing 6 to 20 carbon atoms, at least one hydrogen atom of which is substituted with a substituted or unsubstituted alkyl group containing 1 to 30 carbon atoms.

These groups may be groups containing a double bond, a triple bond, or a cyclic structure.

Moreover, in the formula (4), $A_1$ and $A_2$ each independently represent an ester bond, a thioester bond, an amide bond, a thioamide bond, an imide bond, a ureido bond, an imine bond, a urea bond, a ketoxime bond, an azo bond, an ether bond, a thioether bond, a urethane bond, a thiourethane bond, a sulfide bond, a disulfide bond, or a trisulfide bond.

Furthermore, in the formulae (5) and (6), $A_3$, $A_4$ and $A_5$ each independently represent a hydroxyl group, an acyl group, an aldehyde group, a carboxyl group, an acetyl group, an amino group, a sulfo group, an amidine group, an azide group, a cyano group, a thiol group, a sulfenic acid group, an isocyanide group, a ketene group, an isocyanate group, a thioisocyanate group, a nitro group, or a thiol group.

From the viewpoint of abrasion characteristics upon sliding under a very small load, which are the effects of the present embodiment, the structures represented by the above general formulae (4), (5) and (6) in (B) the sliding agent having a weight average molecular weight of 10,000 or less are preferably set in the following ranges.

The number of carbon atoms contained in $R_{11}$, $R_{12}$, $R_{13}$, and $R_{14}$ is preferably 2 to 30, more preferably 3 to 30, and further preferably 4 to 30.

In the formula (4), the character x represents an integer of 1 to 100, and preferably an integer of 1 to 10. The character y represents an integer of 1 to 1000, and preferably an integer of 1 to 20.

In the formula (4), preferred $A_1$ and $A_2$ each independently represent an ester bond, a thioester bond, an amide bond, an imide bond, a ureido bond, an imine bond, a urea bond, a ketoxime bond, an ether bond, or a urethane bond; and more preferred $A_1$ and $A_2$ each independently represent an ester bond, an amide bond, an imide bond, a ureido bond, an imine bond, a urea bond, a ketoxime bond, an ether bond, or a urethane bond.

In the formulae (5) and (6), preferred $A_3$, $A_4$ and $A_5$ each independently represent a hydroxyl group, an acyl group, an aldehyde group, a carboxyl group, an acetyl group, an amino group, an azi group, a cyano group, a thiol group, an isocyanide group, a ketene group, an isocyanate group, or a thioisocyanate group; and more preferred $A_3$, $A_4$ and $A_5$ each independently represent a hydroxyl group, an acyl group, an aldehyde group, a carboxyl group, an acetyl group, an amino group, a cyano group, an isocyanide group, a ketene group, or an isocyanate group.

Specifically, the component (B) is not particularly limited. An example of the component (B) is at least one compound selected from the group consisting of alcohol, amine, carboxylic acid, hydroxy acid, amide, ester, polyoxyalkylene glycol, and wax.

As alcohols used in the present embodiment, saturated or unsaturated, monovalent or polyvalent alcohols containing 6 to 30 carbon atoms are preferable. The alcohol is not particularly limited, and specific examples include octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, linolyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, UNILIN alcohol, ethylene glycol, diethylene glycol, triethylene glycol, propylene glycol, dipropylene glycol, butanediol, pentanediol, hexanediol, glycerin, diglycerin, triglycerin, threitol, erythritol, pentaerythritol, arabitol, ribitol, xylitol, sorbite, sorbitan, sorbitol, and mannitol.

Among these, from the viewpoint of the efficiency of sliding properties, alcohols containing 11 or more carbon atoms are preferable. Alcohols containing 12 or more carbon atoms are more preferable, and alcohols containing 13 or more carbon atoms are further preferable. Among these, saturated alcohols are particularly preferable.

Among these, stearyl alcohol, oleyl alcohol, linolyl alcohol, behenyl alcohol, ethylene glycol, propylene glycol, diethylene glycol, and triethylene glycol can be preferably used, and further, behenyl alcohol, diethylene glycol, and triethylene glycol can be particularly preferably used.

Examples of the amine that can be used in the present embodiment include, but are not limited to, primary amine, secondary amine, and tertiary amine.

Examples of the primary amine include, but are not particularly limited to, methylamine, ethylamine, propanamine, butanamine, pentanamine, hexanamine, heptanamine, octanamine, cyclohexylamine, ethylenediamine, aniline, mensenediamine, isophoronediamine, xylenediamine, meta-phenylenediamine, and diaminodiphenylamine.

Examples of the secondary amine include, but are not particularly limited to, dimethylamine, diethylamine, N-methylethylamine, diphenylamine, tetramethylethylenediamine, piperidine, and N,N-dimethylpiperazine.

Examples of the tertiary amine include, but are not particularly limited to, trimethylamine, triethylamine, hexamethylenediamine, N,N-diisopropylethylamine, pyridine, N,N-dimethyl-4-aminopyridine, triethylenediamine, and benzyldimethylamine.

Examples of special amine include, but are not particularly limited to, diethylenetriamine, triethylenetetramine, tetraethylenepentamine, diethylaminopropylamine, and N-aminoethylpiperazine. Among these, hexanamine, heptanamine, octanamine, tetramethylethylenediamine, N,N-dimethylpiperazine, and hexamethylenediamine can be more preferably used, and further, among these, heptanamine, octanamine, tetramethylethylenediamine, and hexamethylenediamine can be particularly preferably used.

The carboxylic acids used in the present embodiment are preferably saturated or unsaturated, monovalent or polyvalent aliphatic carboxylic acids containing 6 to 30 carbon atoms. Specific examples of such carboxylic acids include, but are not particularly limited to, caproic acid, enanthic acid, caprylic acid, undecylic acid, pelargonic acid, lauric acid, tridecylic acid, myristic acid, pentadecylic acid, palmitic acid, margaric acid, stearic acid, nonadecanoic acid, arachic acid, behenic acid, lignoceric acid, cerotic acid, heptaconic acid, montanic acid and the like, adipic acid, pimelic acid, suberic acid, azelaic acid, sebacic acid, melissic acid, lacceric acid, undecylenic acid, elaidic acid, cetoleic acid, brassidic acid, sorbic acid, palmitoleic acid, oleic acid, vaccenic acid, linoleic acid, linolenic acid, eleostearic acid, arachidonic acid, nervonic acid, erucic acid, propiolic acid, and stearolic acid.

Among these, from the viewpoint of the efficiency of sliding properties, fatty acids containing 10 or more carbon atoms are preferable. Fatty acids containing 11 or more carbon atoms are more preferable, and fatty acids containing 12 or more carbon atoms are further preferable. Among these, saturated fatty acids are particularly preferable. Among such saturated fatty acids, palmitic acid, stearic acid, behenic acid, montanic acid, adipic acid, sebacic acid, and the like are industrially easily available, and thus, are further preferable.

Moreover, naturally existing fatty acids containing such a component, or the mixtures thereof may also be available. These fatty acids may be substituted with hydroxy groups, and a synthetic fatty acid obtained by modifying the terminus of UNILIN alcohol that is a synthetic aliphatic alcohol with carboxyl may also be available.

Examples of the hydroxy acid used in the present embodiment include, but are not particularly limited to, aliphatic hydroxy acid and aromatic hydroxy acid. Examples of the aliphatic hydroxy acid include, but are not particularly limited to, glycolic acid, hydroxypropionic acid, hydroxybutanoic acid, hydroxypentanoic acid, hydroxyhexanoic acid, hydroxyheptanoic acid, hydroxynonanoic acid, hydroxydecanoic acid, hydroxyundecanoic acid, hydroxydodecanoic acid, hydroxytridecanoic acid, hydroxytetradecanoic acid, hydroxypentadecanoic acid, hydroxyhexadecanoic acid, hydroxyheptadecanoic acid, hydroxyoctadecanoic acid, hydroxynonadecanoic acid, hydroxyicosanoic acid, hydroxydocosanoic acid, hydroxytetradocosanoic acid, hydroxyhexadocosanoic acid, hydroxyoctadocosanoic acid, lactic acid, tartronic acid, glyceric acid, hydroxybutyric acid, 2-hydroxybutyric acid, 3-hydroxybutyric acid, γ-hydroxybutyric acid, malic acid, tartaric acid, citramalic acid, citric acid, isocitric acid, leucic acid, mevalonic acid, pantoic acid, ricinoleic acid, ricinelaidic acid, cerebronic acid, quinic acid, and shikimic acid; and further, these isomers may also be available.

Examples of the aromatic hydroxy acid include, but are not particularly limited to, monohydroxybenzoic acid derivatives, such as salicylic acid, creosotic acid (homosalicylic acid, hydroxy(methyl)benzoic acid), vanillic acid, or syringic acid; dihydroxybenzoic acid derivatives, such as protocatechuic acid, resorcylic acid, protocatechuic acid, gentisic acid, or orsellinic acid; trihydroxybenzoic acid derivatives, such as gallic acid; phenylacetic acid derivatives, such as mandelic acid, benzylic acid, atrolactinic acid, or cinnamic acid; and hydrocinnamic acid derivatives, such as melilotic acid, phloretic acid, coumaric acid, umbellic acid, caffeic acid, ferulic acid, or sinapic acid; and further, these isomers may also be available. Among these, aliphatic hydroxy acids are more preferable, and even among such aliphatic hydroxy acids, aliphatic hydroxy acids containing 5 to 30 carbon atoms are further preferable, and aliphatic hydroxy acids containing 8 to 28 carbon atoms are particularly preferable.

The amides used in the present embodiment are preferably saturated or unsaturated, monovalent or polyvalent aliphatic amides containing 6 to 30 carbon atoms. Specific examples of the amide include, but are not particularly limited, as primary amides, saturated or unsaturated amides, such as heptanamide, octanamide, nonanamide, decanamide, undecanamide, laurylamide, tridecylamide, myristylamide, pentadecylamide, cetylamide, heptadecylamide, stearylamide, oleylamide, nonadecylamide, eicosylamide, cerylamide, behenylamide, melissylamide, hexyldecylamide, octyldodecylamide, lauric acid amide, palmitic acid amide, stearic acid amide, behenic acid amide, hydroxystearic acid amide, oleic acid amide, or erucic acid amide.

Examples of secondary amides include, but are not limited to, saturated or unsaturated amides, such as N-oleylpalmitic acid amide, N-stearylstearic acid amide, N-stearyloleic acid amide, N-oleylstearic acid amide, N-stearylerucic acid amide, methylenebis stearic acid amide, ethylenebis capric acid amide, ethylenebis lauric acid amide, ethylenebis stearic acid amide, ethylenebis hydroxystearic acid amide, ethylenebis behenic acid amide, ethylenebis oleic acid amide, ethylenebis erucic acid amide, hexamethylenebis stearic acid amide, hexamethylenebis behenic acid amide, hexamethylenebis oleic acid amide, or hexamethylene hydroxystearic acid amide.

Examples of tertiary amides include, but are not limited to, saturated or unsaturated amides, such as N,N-distearyl adipic acid amide, N,N-distearyl sebacic acid amide, N,N-dioleyl adipic acid amide, N,N-dioleyl sebacic acid amide, or N,N-distearyl isophthalic acid amide.

Among these, palmitic acid amide, stearic acid amide, behenic acid amide, hydroxystearic acid amide, oleic acid amide, erucic acid amide, and N-stearyl stearic acid amide can be more preferably used.

Among these, methylenebis stearic acid amide, ethylenebis lauric acid amide, ethylenebis stearic acid amide, and ethylenebis behenic acid amide can be preferably used. Among these, from the viewpoint of the efficiency of sliding properties, amides containing 10 or more carbon atoms are preferable. Amides containing 11 or more carbon atoms are more preferable, and amides containing 13 or more carbon atoms are further preferable. Among these, saturated aliphatic amides are particularly preferable.

The ester used in the present embodiment is preferably a reaction product in which the aforementioned alcohol has been reacted with carboxylic acid or hydroxy acid to form an ester bond.

Specific examples of the ester include, but are not particularly limited to, butyl stearate, 2-ethylhexyl palmitate, 2-ethylhexyl stearate, monoglyceride behenate, cetyl 2-ethylhexanoate, isopropyl myristate, isopropyl palmitate, cholesteryl isostearate, methyl laurate, methyl oleate, methyl stearate, cetyl myristate, myristyl myristate, octyldodecyl pentaerythritol monooleate myristate, pentaerythritol monostearate, pentaerythritol tetrapalmitate, stearyl stearate, isotridecyl stearate, triglyceride 2-ethylhexanoate, diisodecyl adipate, ethylene glycol monolaurate, ethylene glycol dilaurate, ethylene glycol monostearate, ethylene glycol distearate, triethylene glycol monostearate, triethylene glycol distearate, ethylene glycol monooleate, ethylene glycol dioleate, polyethylene glycol monolaurate, polyethylene glycol monostearate, polyethylene glycol distearate, polyethylene glycol monooleate, glycerin monostearate, glycerin distearate, glycerin monolaurate, glycerin dilaurate, glycerin monooleate, and glycerin dioleate.

Among these, cetyl myristate, diisodecyl adipate, ethylene glycol monostearate, ethylene glycol distearate, triethylene glycol monostearate, triethylene glycol distearate, polyethylene glycol monostearate, and polyethylene glycol distearate can be preferably used, and cetyl myristate, diisodecyl adipate, and ethylene glycol distearate can be particularly preferably used.

Examples of the polyoxyalkylene glycol used in the present embodiment include, but are not limited to, the following three types of polyoxyalkylene glycols.

The first polyoxyalkylene glycol is a polycondensate comprising alkylene glycol as a monomer. Examples of such a polycondensate include, but are not limited to, polyethylene glycol, polypropylene glycol, a block copolymer of ethylene glycol and propylene glycol, and a random copolymer. The polymerization degree of these polycondensates is preferably in the range of 5 to 1000, and more preferably in the range of 10 to 500.

The second polyoxyalkylene glycol is an ether compound of the polycondensate described in the above first polyoxyalkylene glycol and aliphatic alcohol. Examples of such an ether compound include, but are not limited to, polyethylene glycol oleyl ether (polymerization degree of ethylene oxide: 5 to 50), polyethylene glycol cetyl ether (polymerization degree of ethylene oxide: 5 to 50), polyethylene glycol stearyl ether (polymerization degree of ethylene oxide: 5 to 30), polyethylene glycol lauryl ether (polymerization degree of ethylene oxide: 5 to 30), polyethylene glycol tridecyl ether (polymerization degree of ethylene oxide: 5 to 30), polyethylene glycol nonylphenyl ether (polymerization degree of ethylene oxide: 2 to 100), and polyethylene glycol octylphenyl ether (polymerization degree of ethylene oxide: 4 to 50).

The third polyoxyalkylene glycol is an ester compound of the polycondensate described in the above first polyoxyalkylene glycol and higher fatty acid. Examples of such an ester compound include, but are not limited to, polyethylene glycol monolaurate (polymerization degree of ethylene oxide: 2 to 30), polyethylene glycol monostearate (polymerization degree of ethylene oxide: 2 to 50), and polyethylene glycol monooleate (polymerization degree of ethylene oxide: 2 to 50).

Examples of the wax used in the present embodiment include, but are not particularly limited to, shellac wax, beeswax, spermaceti, wool wax, carnauba wax, tallow, rice bran wax, candelilla wax, Japan wax, paraffin wax, microcrystalline wax, montan wax, Fischer-Tropsch wax, polyethylene wax, polypropylene wax, and their high-density polymerization-based wax, low-density polymerization-based wax, oxidized-based wax, acid-modified-based wax, or special monomer-modified-based wax.

Among these, carnauba wax, rice bran wax, candelilla wax, paraffin wax, montan wax, polyethylene wax, and their high-density polymerization-based wax, low-density polymerization-based wax, oxidized-based wax, acid-modified-based wax, or special monomer-modified-based wax can be more preferably used, and further, carnauba wax, rice bran wax, candelilla wax, paraffin wax, polyethylene wax, and their high-density polymerization-based wax, low-density polymerization-based wax, oxidized-based wax, acid-modified-based wax, or special monomer-modified-based wax can be particularly preferably used.

Among these, the component (B) is preferably at least one compound selected from the group consisting of alcohol, amine, carboxylic acid, an ester, an amide compound consisting of monovalent or divalent amine and carboxylic acid, and wax.

These sliding agents may naturally be used alone or in combination.

In the present embodiment, the melting point of the component (B) is preferably 40° C. to 150° C. By setting the melting point of the component (B) at 40° C. or higher, it is likely that the abrasion resistance of the resin molded article at a higher temperature can be improved. On the other hand, by setting the melting point of the component (B) at 150° C. or lower, good dispersion of the component (B) in the resin during processing can be easily achieved. The lower limit of the melting point of the component (B) is more preferably 45° C., further preferably 50° C., and particularly preferably 55° C. On the other hand, the upper limit of the melting point of the component (B) is more preferably 140° C., further preferably 135° C., and particularly preferably 130° C.

It is to be noted that the melting point of the component (B) used in the present embodiment can be measured by the method according to JIS K 7121 (DSC method).

<<(C) Coloring Agent>>

(C) A coloring agent constituting the resin molded article of the present embodiment will be described in detail.

The coloring agent according to the present embodiment means a substance providing a change in the appearance of the resin molded article by actions such as absorption, scattering, reflection, etc. of visible light.

The resin molded article of the present embodiment comprises (C) 0.01 to 3 parts by mass of a coloring agent (which is also referred to as "component (C)" or "(C)" in the present description) based on (A) 100 parts by mass of a polyacetal resin.

In the present embodiment, (C) the coloring agent existing in the resin molded article plays an important role that is a further improvement of sliding properties by being combined with the component (B), as well as the role of coloration that is the original purpose thereof. From the viewpoint of suppressing deterioration of sliding properties, it is important to add the coloring agent in the aforementioned amount range into the resin molded article.

The reason why the sliding properties are improved by the presence of (C) the coloring agent is not clear. It is considered because the surface hardness of the molded article is improved by (C) the coloring agent, thereby improving abrasion resistance, and also because (C) the coloring agent retains (B) the sliding agent and unevenly distributes it close to the surface layer.

The upper limit amount of (C) the coloring agent is preferably 2.5 parts by mass, more preferably 2.0 parts by mass, and particularly preferably 1.8 parts by mass, based on (A) 100 parts by mass of the polyacetal resin. On the other hand, the lower limit amount of (C) the coloring agent is preferably 0.03 parts by mass, more preferably 0.05 parts by mass, and particularly preferably 0.1 part by mass, based on (A) 100 parts by mass of the polyacetal resin.

When (C) the coloring agent comprised in the resin molded article of the present embodiment is an inorganic substance, the shape thereof is preferably a particle. At this time, from the viewpoint of the abrasion resistance of the resin molded article, the number-average equivalent circular diameter of (C) the coloring agent is preferably in the range of 0.01 to 2 µm. The upper limit of the number-average equivalent circular diameter of (C) the coloring agent is more preferably 1.5 µm, and particularly preferably 1.0 µm.

On the other hand, the lower limit of the number-average equivalent circular diameter of (C) the coloring agent is more preferably 0.05 μm, and particularly preferably 0.07 μm.

Moreover, when (C) the coloring agent comprised in the resin molded article of the present embodiment is an inorganic substance, the abundance of particles having a major axis of 10 μm or more in the total particles of the coloring agent is preferably 0.05 or less. From the viewpoint of suppressing deterioration of the abrasion resistance of the resin molded article under a very small load, it is preferable to use a coloring agent, in which the abundance of particles having a long major axis is low. The upper limit of the abundance of particles having a major axis of 10 μm or more in (C) the coloring agent is more preferably 0.04, further preferably 0.03, and particularly preferably 0.01. The lower limit of the abundance of particles having a major axis of 10 μm or more in (C) the coloring agent is not particularly limited, and it is, for example, 0.0001.

Examples of a method of adjusting the abundance of particles having a major axis of 10 μm or more in (C) the coloring agent to be in the above described range include, but are not particularly limited to, the crushing of the coloring agent with a super jet mill, and a method of subjecting a moderately crushed coloring agent to a classification treatment using an air classifier.

The particle diameter of (C) the coloring agent used in the present embodiment can be easily measured by the following method or the like. A part of or the entire resin molded article is burnt at 450° C. for approximately 3 hours to remove all of the organic substances. Subsequently, the residue is gradually cooled and is then collected, and the collected residue is subjected to a particle image analyzer (e.g., PITA-3, manufactured by SEISHIN ENTERPRISE Co., Ltd.), so that the number-average equivalent circular diameter and the abundance of particles having a major axis of 10 μm or more can be easily measured.

Examples of a substance that can be used as a coloring agent (C) in the present embodiment are given below. Examples of such a substance include, but are not limited to, zinc sulfate, titanium oxide, zinc oxide, iron oxide, barium sulfate, titanium dioxide, barium sulfate, hydrous chromium oxide, chromium oxide, cobalt aluminum oxide, baryte powder, zinc yellow type 1, zinc yellow type 2, ferric ferrocyanide potassium, kaolin, titanium yellow, cobalt blue, ultramarine blue, cadmium, nickel titanium, lithopone, strontium, umber, sienna, azurite, malachite, azuromalachite, orpiment, realgar, cinnabar, turquoise, rhodochrosite, yellow ocher, terre verte, raw sienna, raw umber, Cassel earth, chalk, plaster, burnt sienna, burnt umber, lapis lazuli, azurite, malachite, coral powder, white mica, cobalt blue, cerulean blue, cobalt violet, cobalt green, zinc white, titanium white, light red, chrome oxide green, Mars black, viridian, alumina white, cadmium yellow, cadmium red, vermilion, talc, white carbon, clay, mineral violet, rose cobalt violet, silver white, gold powder, bronze powder, aluminum powder, Prussian blue, aureolin, wollastonite, titanated mica, carbon black, acetylene black, lamp black, Furnace black, vegetable black, bone char, calcium carbonate, and iron blue.

Among these, the present resin molded article preferably comprises an oxide of at least one metal selected from the group consisting of iron, zinc, and titanium. It is to be noted that the term "oxide of metal" is used herein to also include a "composite metal oxide" consisting of two or more metals selected from among iron, zinc and titanium.

Examples of the oxide of at least one metal selected from the group consisting of iron, zinc and titanium include, but are not particularly limited to, zinc sulfate, zinc oxide, iron oxide, titanium dioxide, titanium yellow, cobalt blue, and carbonates of iron, zinc or titanium. In particular, since zinc oxide and titanium yellow have sufficiently low Mohs' hardness and further can provide high abrasion resistance, these are more preferable.

<<(D) Polyolefin Resin>>

Next, (D) a polyolefin resin, which can be used as an additional component in the present embodiment, will be described in detail.

(D) The polyolefin resin used in the present embodiment is a polyolefin resin having a weight average molecular weight of more than 10,000.

The resin molded article of the present embodiment may comprise (D) a polyolefin resin in an amount of 0.01 to 5 parts by mass, based on (A) 100 parts by mass of a polyacetal resin.

Since the resin molded article of the present embodiment comprises, as an additional component, (D) the polyolefin resin, it is likely that sliding properties under a high load can also be improved.

The upper limit value of the content of (D) the polyolefin resin is more preferably 4 parts by mass, further preferably 3.5 parts by mass, and particularly preferably 3 parts by mass, based on 100 parts by mass of (A) the polyacetal resin. On the other hand, the lower limit of the content of (D) the polyolefin resin is more preferably 0.3 parts by mass, and particularly preferably 0.5 parts by mass, based on 100 parts by mass of (A) the polyacetal resin.

From the viewpoint of preventing peeling of the layer from the resin molded article, the amount of (D) the polyolefin resin to be added as an additional component is preferably within the aforementioned range.

(D) The polyolefin resin used in the present embodiment is preferably one or more polyolefin resins selected from the group consisting of a homopolymer of an olefin-based compound represented by the following general formula (7), a copolymer comprising, as a principal monomer, an olefin-based compound represented by the following general formula (7), and a modified product thereof.

(7)

In the above formula (7), $R_{21}$ represents a hydrogen atom or a methyl group, and $R_{22}$ represents a hydrogen atom, an alkyl group containing 1 to 10 carbon atoms, a carboxyl group, an alkylated carboxy group containing 2 to 5 carbon atoms, an acyloxy group containing 2 to 5 carbon atoms, or a vinyl group.

Other monomers can be selected, as appropriate, from monomers polymerizable with the olefin-based compound represented by the above general formula (7).

Examples of the (D) the polyolefin resin that can be used in present embodiment include, but are not limited to, polyethylene, polypropylene, an ethylene-propylene copolymer, an ethylene-butene copolymer, a propylene-butene copolymer, polybutene, a hydrogenated product of polybutadiene, an ethylene-acrylic acid ester copolymer, an ethylene-methacrylic acid ester copolymer, an ethylene-acrylic acid copolymer, and an ethylene-vinyl acetate copolymer. Among these, the polyolefin resin is preferably at least one selected from the group consisting of polyethylene, polypropylene, an ethylene-α-olefin copolymer, an ethylene-acrylic acid ester copolymer in which the content of an acrylic acid ester unit is 5% to 30% by mass; a block polymer having a structure in which a block of polyolefin (d1) and a block of a hydrophilic polymer (d2) are repeatedly and alternatively bound to one another via at least one bond selected from the group consisting of an ester bond, an amide bond, an ether bond, a urethane bond, and an imide bond; and a modified product thereof.

Specific examples of the polyolefin (d1) include, but are not limited to, polyethylene, polypropylene, and polybutadiene. In addition, specific examples of the hydrophilic polymer (d2) include, but are not limited to, polyvinyl acetate, methyl polymethacrylate, and polylactic acid.

Among these, polyethylene (high-pressure low-density polyethylene, linear low-density polyethylene, or ultralow density polyethylene), an ethylene-propylene copolymer, an ethylene-butene copolymer, and an ethylene-octene copolymer can be more preferably used.

In the present embodiment, as (D) a polyolefin resin, a modified polyolefin resin (modified product) can also be used without problems. Examples of the present modified product include a graft copolymer prepared by grafting one or more of vinyl compounds that are different from the polymer forming the olefin resin; a polyolefin resin modified with α,β-unsaturated carboxylic acid (acrylic acid, methacrylic acid, maleic acid, fumaric acid, itaconic acid, citraconic acid, nadic acid, etc.) or an acid anhydride thereof (as necessary, also using a peroxide in combination); and a product obtained by copolymerizing an olefin-based compound and an acid anhydride.

The above described (D) polyolefin resins can be used alone or as a mixture.

(D) The polyolefin resin that can be preferably used in the present embodiment preferably has a melt flow rate (hereinafter also referred to as "MFR") under loading conditions of 190° C. and 2.16 kg that is in the range of 0.01 to 50 g/10 minutes. (D) The polyolefin resin having MFR that is in the aforementioned range has a molecular weight sufficiently higher than a weight average molecular weight of 10,000. By setting the MFR of (D) the polyolefin resin in the aforementioned range, deterioration of the friction and abrasion characteristics of the resin molded article under high loading conditions can be suppressed, and generation of creaking noise can also be suppressed.

The lower limit of the MFR of (D) the polyolefin resin is more preferably 0.02 g/10 minutes, further preferably 0.05 g/10 minutes, and particularly preferably 0.07 g/10 minutes. On the other hand, the upper limit of the MFR of (D) the polyolefin resin is more preferably 40 g/10 minutes, further preferably 30 g/10 minutes, and particularly preferably 2.5 g/10 minutes.

<<Other Components>>

The polyacetal resin molded article of the present embodiment can comprise various types of stabilizers that have conventionally been used in polyacetal resin compositions, in a range in which the stabilizers do not impair the object of the present invention. Examples of the stabilizer include, but are not limited to, the below-mentioned antioxidants, and formaldehyde or formic acid scavengers. These stabilizers may be used as a single type alone, or in combination of two or more types.

From the viewpoint of the improvement of the heat stability of the polyacetal resin molded article, the above-mentioned antioxidant is preferably a hindered phenol-based antioxidant.

The hindered phenol-based antioxidant is not particularly limited, and known antioxidants can be used, as appropriate.

The formaldehyde or formic acid scavenger is not particularly limited. Examples include formaldehyde reactive nitrogen-containing compounds, such as melamine or a polyamide-based resin, and polymers thereof, hydroxides of alkaline metals or alkaline-earth metals, inorganic acid salts, and carboxylates. Specific examples include calcium hydroxide, calcium carbonate, calcium phosphate, calcium silicate, calcium borate, and fatty acid calcium salts (calcium stearate, calcium myristate, etc.). Such fatty acid may be substituted with a hydroxyl group.

With regard to the amounts of the aforementioned stabilizers added, an antioxidant, for example, a hindered phenol-based antioxidant is preferably used in an amount of 0.1 to 2 parts by mass, a formaldehyde or formic acid scavenger, for example, a polymer containing formaldehyde reactive nitrogen is preferably used in an amount of 0.1 to 3 parts by mass, and fatty acid salt of alkaline-earth metal is preferably used in an amount of 0.1 to 1 part by mass, based on 100 parts by mass of the polyacetal resin (A).

<<Method for Producing the Resin Molded Article of the Present Embodiment>>

The polyacetal resin molded article of the present embodiment can be obtained, for example, by molding a polyacetal resin composition. Herein, the polyacetal resin composition (which is simply referred to as a "resin composition" at times) means a composition, which comprises, at least, (B) 0.1 to 5 parts by mass of a sliding agent having a weight average molecular weight of 10,000 or less, and (C) 0.01 to 3 parts by mass of a coloring agent, based on (A) 100 parts by mass of a polyacetal resin.

The resin molded article of the present embodiment is a resin molded article comprising, as constitutional components, (B) 0.1 to 5 parts by mass of a sliding agent having a weight average molecular weight of 10,000 or less, and (C) 0.01 to 3 parts by mass of a coloring agent, based on (A) 100 parts by mass of a polyacetal resin. As methods of obtaining a molded article consisting of these components, known methods can be used. Examples of such a known method include a single-screw or multi-screw kneading extruder, a roll, and a Banbury mixer. Among others, a twin-screw extruder equipped with a pressure-reducing device, side-feeder equipment and the like can be particularly preferably used.

Methods of mixing, fusing and kneading raw material components are not particularly limited, and methods well known to a person skilled in the art can be used. Examples of such a well-known method include: a method, which comprises previously mixing all of the component (A), the component (B) and the component (C) using a super-mixer, a tumbler, a V-shaped blender, etc., and then fusing and kneading the obtained mixture, all at once, with a twin-screw extruder; and a method, which comprises previously mixing the component (A) and the component (C), then supplying the obtained mixture to a twin-screw extruder or the like, and then, while fusing and kneading the mixture, adding the component (B), which has been fused to be a liquid state, to the above mixture through the middle part of the extruder. All of these methods can be applied without problems.

As a method of obtaining the resin molded article of the present embodiment having a special surface layer, for example, the following method is applied. The special surface layer according to the present embodiment is a surface layer, in which the relative element concentration ratio [C/O] (atomic %) between carbon and oxygen on the surface of the molded article (hereinafter also abbreviated as a "C/O ratio") is 1.01 to 2.50. The numerical limit of this C/O ratio means whether or not the amount of a sliding agent bleeding out on the surface layer of a molded article is large, when the sliding agent is simply added to polyacetal. If the C/O ratio has a numerical value of more than 2.50, it means that a large amount of the sliding agent bleeds out on the surface of the molded article.

That is to say, the essential matter in the present embodiment is a molded article, which comprises (B) 0.1 to 5 parts by mass of a sliding agent component having a weight average molecular weight of 10,000 or less, based on (A) 100 parts by mass of a polyacetal resin, wherein the amount of the component (B) bleeding out on the surface of the resin molded article is very small.

Moreover, it is more preferably a special surface layer, in which the peak intensity ratio (C—O/C=O) between a C—O stretching vibration peak and a C=O stretching vibration peak on the surface, which is obtained by infrared spectroscopy, is 10 to 200. The numerical limit of this peak intensity ratio (C—O/C=O) means an indicator for the amount of (B) the sliding agent constituting the present resin molded article, which is present close to the surface layer (within several μm in depth). The present peak intensity ratio (C—O/C=O) is preferably 10 to 200. The fact that the present peak intensity ratio (C—O/C=O) exceeds 200 means that almost no sliding agent is present close to the surface layer. In contrast, the fact that the present peak intensity ratio (C—O/C=O) is less than 10 means that an extremely large amount of sliding agent is unevenly distributed around the surface layer.

That is, a more preferred matter in the present embodiment is a molded article, which comprises (B) 0.1 to 5 parts by mass of a sliding agent having a weight average molecular weight of 10,000 or less, based on (A) 100 parts by mass of a polyacetal resin, wherein a sufficient amount of sliding agent is present in a region several μm from the surface layer, although the amount of the sliding agent component bleeding out is very small.

In order to obtain such a resin molded article, in which the amount of a sliding agent bleeding out on the surface layer is very small but a sufficient amount of a sliding agent is present in a region several μm from the surface layer, a method of allowing a sliding agent to stably exist in a molded article can be adopted.

Examples of the method of allowing a sliding agent to stably exist in a molded article include (a) a method of reducing the crystallinity of polyacetal, (b) a method of using the above described block copolymer-type polyacetal comprising a block having the function of retaining a sliding agent, (c) a method of dispersing a fine-particle coloring agent in a molded article, and (d) a method of kneading the mixture by using a sliding agent having a melting point that is sufficiently lower than the processing temperature of polyacetal (e.g., 150° C. or lower) under sufficient shearing during processing.

Examples of (a) the method of reducing the crystallinity of polyacetal include (a1) a method of using an acetal copolymer having a low melting point, in which the ratio of a comonomer in a polyacetal resin is increased, (a2) a method which comprises performing injection molding using a low-temperature mold, and then performing quick-cooling of the surface layer, so as to reduce the crystallinity around the surface layer of a molded article, and (a3) a method of reducing the thickness of a molded article at a sliding portion to improve cooling efficiency, so as to suppress the crystallization of the portion.

From the viewpoint of obtaining the resin molded article of the present embodiment, among the above described methods, the methods (a) to (c) and the combined use of these methods are particularly effective.

The molding method of obtaining the resin molded article of the present embodiment is not particularly limited. Known molding methods can be applied. The present resin molded article can be molded, for example, by any one of molding methods such as extrusion molding, injection molding, vacuum molding, blow molding, injection compression molding, decorative molding, different material molding, gas-assisted injection molding, foam injection molding, low-pressure molding, ultrathin-walled injection molding (ultra-high-speed injection molding), or in-mold composite molding (insert molding, outsert molding).

<Intended Use>

As intended use of the resin molded article of the present embodiment, the present resin molded article can be preferably used for intended use, for which repeated sliding is required under a very small load.

Specific examples of such intended use include internal components for hard disk (lamp, latch material, etc.) and internal components for watches (gears, balances, anchor strikers, escape wheels, etc.).

Other than these, since the present resin molded article has high sliding properties even under a high load, it can be applied to known intended uses of polyacetal. Examples will be given below. Examples of other intended uses of the present resin molded article include: mechanism elements representatively including a cam, a slider, a lever, an arm, a clutch, a felt clutch, an idle gear, a pulley, a roller, a roll, a key stem, a key top, a shutter, a reel, a shaft, a joint, an axis, a bearing, and a guide; components for office automation equipment, representatively including a resin component used for outsert molding, a resin component used for insert molding, chassis, tray, lateral plate, printer, and copying machine; components for video equipment, such as digital video camera and digital camera; drives for CD, DVD, Blu-ray (registered trademark) Disc, and other optical disks; components used for music, video or information devices, representatively including navigation system and mobile personal computer, and components for communication equipment representative including portable phones and facsimile; components for electric equipment; and components for electronic equipment. Moreover, examples of the automobile components, to which the present resin molded article can be applied, include: fuel-related components representatively including gasoline tank, fuel pump module, valves, and gasoline tank flange; door-related components representatively including door lock, door handle, window regulator, and speaker grill; seat belt-related components representatively including slip ring for seat belt and press button; and other components such as combination switch components, and components for switches and clips. Further, examples of other products, to which the present resin molded article can be preferably used, include: pen points of writing materials, and mechanism elements for taking in or out pen points; elements for washing stands, drain outlets, and drain valve-opening and closing mechanisms; code stopper, adjuster and button for clothes; nozzles for water-sprinkling and water-sprinkling hose-connected joints; building supplies that are stair handrail portions and floor material-supporting portions; toys, fasteners, chains, conveyers, buckles, sporting goods, vending machines (elements for opening/closing part locking mechanism and good-emitting mechanism), and components for furniture, musical instrument, and housing equipment.

EXAMPLES

Hereinafter, the present invention will be specifically described in the following examples. However, these examples are not intended to limit the scope of the present invention.

Processing conditions and evaluation items for the polyacetal resin compositions and resin molded bodies of the examples and comparative examples will be described below.

[1] Extrusion Processing

A twin-screw extruder (manufactured by TOSHIBA MACHINE CO., LTD., TEM-26SS extruder (L/D=48, with a vent) was used, and all of cylinder temperatures were set at 200° C. Thereafter, a component (A) to a component (C), and in some cases, a component (D), and also, additional components were mixed with one another all at once, and were then supplied through a quantitative feeder from the main throat portion of the extruder. A resin kneaded mixture was extruded in the form of a strand under conditions of an extruded amount of 15 kg/hour and a screw rotation speed of 150 rpm, and it was then quickly cooled in a strand bath. The resultant was cut using a strand cutter to obtain a pellet-shaped molded article.

[2] Molding Processing (Production of Multi-Purpose Test Piece-Shaped Molded Article Using Injection Molding Machine)

An injection molding machine (EC-75NII, manufactured by TOSHIBA MACHINE CO., LTD.) was used, and the cylinder temperature was set at 205° C. Molding was carried out under injection conditions of an injection time of 35 seconds and a cooling time of 15 seconds to obtain a multi-purpose test piece-shaped resin molded article that was in compliance with ISO294-1. During this operation, two conditions were prepared for the mold temperature, namely, 30° C. and 80° C.

[3] Molding Processing (Production of Lamp-Shaped Molded Article Using Injection Molding Machine)

A lamp test piece mold was used, and an injection molding machine (EC-75NII, manufactured by TOSHIBA MACHINE CO., LTD.) was employed. The cylinder temperature was set at 205° C., the mold temperature was set at 80° C., and molding was carried out under injection conditions of an injection time of 10 seconds and a cooling time of 10 seconds to obtain a lamp-shaped resin molded article.

[4] Molding Method Involving Instantaneous Heating of Mold Surface: BSM (Bright Surface Molding) Molding Method As a means for instantaneously heating a mold surface, an injection molding machine (NEX50III, manufactured by NISSEI PLASTIC INDUSTRIAL CO., LTD.), which was equipped with an electromagnetic induction heating device and had a clamping pressure of 50 tons was used. Immediately before injection, the temperature of the mold surface was increased to 145° C., and injection molding was then performed. During this operation, the cylinder temperature was set at 205° C., the injection time was set at 10 seconds, and the cooling time was set at 30 seconds, and as a result, a small plate (6 cm height, 4 cm width, and 2 cm depth) comprising a weld portion having a hole (a diameter of 20 mm) in the center thereof was obtained.

[5] Relative Element Concentration Ratio [C/O]

The relative element concentration ratio [C/O] (atomic %) between carbon and oxygen on the surface of each of the multi-purpose test piece and the lamp test piece, which had been obtained by molding processing, was measured as follows. As measuring equipment, ESCALAB250 manufactured by Thermo Fisher Scientific K. K. was used, and as an excitation source, monoAlKα (15 kV×10 mA) was used. Upon the measurement, a sample was cut into a size of approximately 1 mm (elliptical shape), and then, in order to remove substances adhering to the surface layer of the molded article, an aqueous solution (1.5%) of a commercially available cleaning agent (VALTRON DP97031) for precision equipment was used to perform ultrasonic cleaning under conditions of 50° C. and 3 minutes, so that organic substances were removed from the surface. Thereafter, an ultrasonic treatment was carried out using distilled water for high performance liquid chromatography under a condition of room temperature for 15 minutes, so that the sample was washed. Subsequently, after completion of the washing, the sample was subjected to a drying treatment in a drying oven at 80° C. for 1 hour, and was then subjected to measurement. In the present measurement, the photoelectron acceptance angle was set at 0° (the axis of a spectroscope was vertical to the surface of the sample), and the uptake region was set at 0 to 1100 eV in the case of Survey scan, and at the regions of C 1s, O 1s, and N 1s in the case of Narrow scan. Moreover, Pass Energy was carried out at 100 eV in the case of Survey scan and at 20 eV in the case of Narrow scan. During this operation, the C concentration was indicated as a peak area ratio in the peak top range from 284 eV to 288 eV. In addition, the O concentration was indicated as a peak area ratio in the peak top range of 530 eV to 536 eV. A relative element concentration was calculated from the area ratio of individual peaks, and the obtained value was then rounded off, so that a value of 1 atomic % or greater was calculated as a two-digit significant figure, and a value of less than 1 atomic % was calculated as a one-digit significant figure. The ratio between the element concentrations was defined as a "relative element concentration ratio between carbon and oxygen on the surface."

[6] Peak Intensity Ratio (C—O/C=O)

The peak intensity ratio (C—O/C=O) between a C—O stretching vibration peak and a C=O stretching vibration peak on the surface of each of the multi-purpose test piece-shaped molded bodies obtained in the examples and comparative examples was obtained by analyzing by infrared spectroscopy, as described below. As measuring equipment, Spectrum One manufactured by Perkin-Elmer was used, and the peak intensity ratio (C—O/C=O) was measured by an ATR method (crystals: diamond/ZnSe). The measurement range was set from 500 $cm^{-1}$ to 4000 $cm^{-1}$, wavenumber resolution was set at 4 $cm^{-1}$, and the cumulated number was set at 16. During the measurement, as a C—O (derived from the repeating structure of polyacetal) signal, the peak intensity (peak height) at 1090 $cm^{-1}$ was calculated, and as a C=O signal, the peak intensity from 1600 $cm^{-1}$ to 1750 $cm^{-1}$ was calculated. Then, the "peak intensity ratio (C—O/C=O) between the C—O stretching vibration peak and the C=O stretching vibration peak on the surface of the molded article" was obtained. When the peak intensity was obtained, a linear baseline was drawn from 1040 $cm^{-1}$ to 1160 $cm^{-1}$, and also from 1590 $cm^{-1}$ to 1760 $cm^{-1}$, and a positive height from the baseline was read out as peak intensity.

In order to remove the influence of a sliding agent bleeding out on the outermost layer, the molded article to be measured was subjected to the washing operation described in [5] above, immediately before the measurement.

[7] High Load Sliding Test

Using a ball-on-disk-based reciprocating motion friction abrasion testing machine (AFT-15MS, manufactured by TOYO PRECISION PARTS MFG. CO., LTD.), a multi-purpose test piece-shaped molded article was subjected to a sliding test in an environment of a temperature of 23° C. and a humidity of 50%, under conditions of a load of 19.6 N, a linear velocity of 30 mm/sec, a round-trip distance of 20 mm, and the number of round-trips of 10,000. As a ball material, SUS 304 ball (a sphere having a diameter of 5 mm) was used.

[8] Very Small Load Sliding Test

Using a ball-on-disk-based friction abrasion testing machine (Nano tribometer 2, TTX-NTR2, manufactured by CSM Instruments), a multi-purpose test piece-shaped molded article was subjected to a sliding test in an environment of a temperature of 23° C. and a humidity of 50%, under conditions of a load of 0.1 N, a sliding velocity of 200 mm/sec, a round-trip distance of 200 μm, and the number of round-trips of 1,200,000. As a ball material, SUJ 2 ball (a sphere having a diameter of 1.5 mm) was used.

[9] Abrasion Loss

The abrasion loss (abrasion depth, abrasion cross-sectional area) of the sample after completion of the sliding tests described in [7] and [8] above was measured using a confocal microscope (OPTELICS (registered trademark) H1200, manufactured by Lasertec Corporation). The abrasion cross-sectional area was defined as a mean value of numerical values measured at n=5, and was rounded off at a two-digit significant figure. It was evaluated that the smaller the numerical value, the more excellent abrasion characteristics that could be obtained.

[10] Adhesion of Sliding Agent to SUJ 2 Ball in Early Stage

A sliding test was carried out in the same manner as in [8] above, with the exception that the number of sliding was changed from 1,200,000 to 10,000 in the very small load sliding test. The amount of the sliding agent adhering to the SUJ 2 ball after completion of the sliding test was confirmed using a confocal microscope (OPTELICS (registered trademark) H1200, manufactured by Lasertec Corporation). The confirmation was performed by a method in which the height of a substance adhering around the sliding portion of the ball was measured and then the height of the adhering substance was calculated based on the curvature of the surface of the ball.

[11] Amount of Abrasion Powder Generated after 1,200,000 Times of Sliding

The sliding portion was confirmed using a confocal microscope (OPTELICS (registered trademark) H1200, manufactured by Lasertec Corporation), after 1,200,000 times of sliding in the very small load sliding test in [8] above. The amount of the abrasion powder existing around the sliding portion was evaluated by grading it on 5 steps based on visual observation. The evaluation criteria are as follows.

AAA: No abrasion powder is present close to sliding portion.

AA: Abrasion powder is present at both ends of sliding portion.

A: A small amount of abrasion powder is present around the sliding portion.

B: Abrasion powder is present, so that the powder covers the periphery of sliding portion.

C: The entire sliding portion is covered with abrasion powder.

[12] Bleed Out Test

The multi-purpose test piece-shaped molded article obtained at a mold temperature of 80° C. in the above [2] Molding processing (production of multi-purpose test piece-shaped molded article using injection molding machine) was exposed in a thermo-hygrostat (Platinous Rainbow PR-2KTH, manufactured by Tabai Espec Corporation), in which the temperature was set at 85° C. and the humidity was set at 85%, for 1 week. After completion of the exposure, the surface of the molded article was evaluated using a confocal microscope (OPTELICS (registered trademark) H1200, manufactured by Lasertec Corporation). At this time, the number of precipitates in a visual field of 0.25 mm×0.25 mm was counted, and the obtained value was then compared with the number of precipitates relative to a unit area (1 $cm^2$). The smaller value of the obtained values indicates more excellent bleed out performance.

Raw material components for the polyacetal resin compositions and the molded bodies used in the examples and comparative examples will be described below.

(A) Production Example of Polyacetal Resin (A1) Common Polyacetal Copolymer

A common polyacetal copolymer was prepared as follows.

A twin-screw self-cleaning-type polymerizer with a jacket capable of giving a passage to a heating medium (L/D=8 (L: distance (m) from the raw material supplying port of the polymerizer to the discharge port thereof; D: the internal diameter (m) of the polymerizer) was adjusted to 80° C. To the above described polymerizer, 4 kg/hour of trioxane, 128.3 g/hour of 1,3-dioxolane used as a comonomer, and methylal used as a chain transfer agent, in an amount of $0.25 \times 10^{-3}$ mole based on 1 mole of trioxane, were continuously added.

Moreover, to the above described polymerizer, boron trifluoride di-n-butyletherate used as a polymerization catalyst, in an amount of $1.5 \times 10^{-5}$ moles based on 1 mole of trioxane, was continuously added, and polymerization was then carried out. A polyacetal copolymer discharged from the polymerizer was poured into an aqueous solution of 0.1% triethylamine, so that the polymerization catalyst was inactivated.

The thus inactivated polyacetal copolymer was filtrated using a centrifuge. Thereafter, 1 part by mass of an aqueous solution containing a quaternary ammonium compound was added to 100 parts by mass of the polyacetal copolymer, and they were homogeneously mixed. Thereafter, the obtained mixture was supplied to a vented twin-screw extruder, and 0.5 parts by mass of water was then added to 100 parts by mass of the polyacetal copolymer melted in the extruder, so that an unstable terminal portion of the polyacetal copolymer was decomposed and removed at an extruder preset temperature of 200° C. and a retention time in the extruder of 7 minutes. During this operation, the amount of the quaternary ammonium compound added was set at 20 ppm by mass, relative to the amount of nitrogen.

Thereafter, 0.3 parts by mass of triethylene glycol-bis-[3-(3-t-butyl-5-methyl-4-hydroxyphenyl)-propionate] was added as an antioxidant to the polyacetal copolymer, the unstable terminal portion of which had been decomposed, and the obtained mixture was then extruded as a strand from the die portion of the vented extruder, while devolatilization was performed under conditions of a vacuum degree of 20 Torr. Thereafter, the strand was pelletized.

The thus obtained polyacetal copolymer was defined as a polyacetal resin (A1). The melt flow rate of the polyacetal resin (A1) was 9 g/10 minutes (ISO-1133 condition D).

(A2) Polyacetal Copolymer Comprising Large Amount of Comonomer

A polyacetal copolymer having a high comonomer ratio was obtained totally in the same manner as in the production example of (A1) the polyacetal resin, with the exception that the amount of 1,3-dioxolane used as a comonomer to be added was changed to 200 g/hour.

(A3) Polyacetal Block Copolymer 1

A twin-screw puddle-based continuous polymerizer with a jacket capable of giving a passage to a heating medium was adjusted to 80° C. 40 Moles/hour of trioxane, 2 moles/hour of 1,3-dioxolane used as cyclic formal, boron trifluoride di-n-butyletherate dissolved in cyclohexane, used as a polymerization catalyst, in an amount of $5 \times 10^{-5}$ moles based on 1 mole of trioxane, and hydrogenated polybutadiene having hydroxyl groups at both ends (number average molecular weight Mn=2330) represented by the following formula (8), used as a chain transfer agent, in an amount of $1 \times 10^{-3}$ moles based on 1 mole of trioxane, were continuously supplied to the above described polymerizer, and polymerization was then carried out.

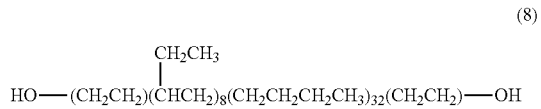

(8)

Subsequently, a polymer discharged from the above described polymerizer was poured into an aqueous solution of 0.1% triethylamine, so that the polymerization catalyst was completely inactivated. Thereafter, the polymer was filtrated and washed to obtain a crude polyacetal block copolymer.

1 Part by mass of an aqueous solution containing a quaternary ammonium compound was added to 100 parts by mass of the crude polyacetal block copolymer, and they were homogeneously mixed. Thereafter, the obtained mixture was supplied to a vented twin-screw extruder, and 0.5 parts by mass of water was then added to 100 parts by mass of the polyacetal block copolymer melted in the extruder, so that an unstable terminal portion of the polyacetal block copolymer was decomposed and removed at an extruder preset temperature of 200° C. and a retention time in the extruder of 7 minutes. During this operation, the amount of the quaternary ammonium compound added was set at 20 ppm by mass, relative to the amount of nitrogen.

Thereafter, 0.3 parts by mass of triethylene glycol-bis-[3-(3-t-butyl-5-methyl-4-hydroxyphenyl)-propionate] was added as an antioxidant to the polyacetal block copolymer, the unstable terminal portion of which had been decomposed, and the obtained mixture was then extruded as a strand from the die portion of the vented extruder, while devolatilization was performed under conditions of a vacuum degree of 20 Torr. Thereafter, the strand was pelletized.

The thus obtained polyacetal block copolymer was defined as (A3) a polyacetal block copolymer 1. This block copolymer was an ABA-based block copolymer, and had a melt flow rate of 10.0 g/10 minutes (ISO-1133 condition D).

(A4) Polyacetal Block Copolymer 2

A polyacetal block copolymer was obtained totally in the same manner as in the production example of (A3) polyacetal block copolymer 1, with the exception that the hydrogenated polybutadiene having hydroxyl groups at both ends, added as a chain transfer agent, was changed to one having a number average molecular weight of 3170. The thus obtained polyacetal block copolymer was defined as (A4) a polyacetal block copolymer 2. This block copolymer was an ABA-based block copolymer, and had a melt flow rate of 11.0 g/10 minutes (ISO-1133 condition D).

Component (B): Sliding Agent (B1) Ethylene glycol distearate: weight average molecular weight: 623, manufactured by HOKKO CHEMICALS Co., Ltd., melting point: 65° C.

(B2) Ethylenebis stearic acid amide: weight average molecular weight: 593, manufactured by HOKKO CHEMICALS Co., Ltd., melting point: 145° C.

(B3) Cetyl myristate: weight average molecular weight: 453, manufactured by HOKKO CHEMICALS Co., Ltd., melting point: 50° C.

(B4) Polyolefin: weight average molecular weight (Mw): 15000, melting point: 153° C., VISCOL 330-P, manufactured by Sanyo Chemical Industries, Ltd.

It is to be noted that, in the present examples, the weight average molecular weight of the component (B) was measured by liquid chromatograph/mass spectrometry, when the weight average molecular weight was 1000 or less, and it was measured by gel permeation chromatography, when the weight average molecular weight was greater than 1000. In addition, the melting point of the component (B) was measured by a DSC method, which was in compliance with JIS K 7121.

Component (C): Coloring Agent (C1) Titanium iron composite oxide (circle equivalent particle diameter: 2.0 μm, the abundance of particles having a major axis of 10 μm or more=0.10)

(C2) Titanium iron composite oxide (circle equivalent particle diameter: 2.0 μm, the abundance of particles having a major axis of 10 μm or more=0.05)

(C3) Zinc oxide (circle equivalent particle diameter: 2.0 μm, the abundance of particles having a major axis of 10 μm or more=0.03)

It is to be noted that, in the present examples, the D50 particle diameter of (C) the coloring agent and the abundance of particles having a major axis of 10 μm or more in (C) the coloring agent were measured using a particle image analyzer (PITA-3, manufactured by SEISHIN ENTERPRISE Co., Ltd.).

(D) Polyolefin Resin (D1) Ethylene-acrylic acid ester copolymer (NUC-6520, manufactured by UNICA Co., Ltd., content of ethyl acrylate: 24% by mass, melting point: 95° C., melt flow rate (JIS K6922-2 condition): 1.6 g/10 minutes)

Examples 1 to 8

Individual components were mixed with one another at the ratio shown in Table 1, and they were then fused and kneaded in the manner described in [1] Extrusion processing. Thereafter, a molded article was produced from the kneaded mixture under conditions of 30° C. of a mold temperature in the manner described in [2] Molding processing (production of multi-purpose test piece-shaped molded article using injection molding machine), and various types of performances of the molded article were then evaluated.

TABLE 1

|  | Unit | Example 1 | Example 2 | Example 3 | Example 4 | Example 5 | Example 6 | Example 7 | Example 8 |
|---|---|---|---|---|---|---|---|---|---|
| A1 | Part by mass | 100 | | | 100 | | | | |
| A2 | Part by mass | | 100 | | | 100 | 100 | 100 | |
| A3 | Part by mass | | | 100 | | | | | 100 |
| B1 | Part by mass | 0.2 | 0.2 | 0.2 | 1 | 1 | 1 | 1 | 1 |
| C1 | Part by mass | 0.5 | 0.5 | 0.5 | 0.5 | 0.5 | | | |
| C2 | Part by mass | | | | | | 0.5 | | 0.5 |
| C3 | Part by mass | | | | | | | 0.5 | |
| Relative element concentration ratio C/O (atomic %) | [—] | 1.85 | 1.20 | 1.03 | 2.50 | 2.13 | 2.12 | 2.15 | 1.22 |
| Peak intensity ratio (C—O)/(C=O) | [—] | 196 | 150 | 68 | 185 | 145 | 115 | 95 | 52 |
| Abrasion loss: very small load sliding test | μm$^2$ | 210 | 125 | 115 | 85 | 96 | 63 | 55 | 35 |
| Abrasion loss: high load sliding test | μm | 10.5 | 8.3 | 6.3 | 10.5 | 9.8 | 8.5 | 6.2 | 5.2 |
| Adhesion of sliding agent to SUJ 2 ball after 10,000 times of sliding | μm | 5.8 | 4.5 | 0.5 or less | 8.5 | 5.9 | 5.5 | 6.8 | 0.5 or less |
| Amount of abrasion powder generated after 1,200,000 times of sliding | μm | B | A | AA | B | A | AA | AA | AAA |

Comparisons were made among Examples 1 to 3, between Examples 4 and 5, and between Examples 6 and 8, based on a change in the types of polyacetals. It was found that, with regard to the types of polyacetals, a molded article comprising (A2) the polyacetal copolymer containing a large amount of comonomer had a smaller amount of sliding agent bleeding out on the surface (i.e., the relative element concentration ratio C/O was low), than in the case of a molded article comprising (A1) the common polyacetal copolymer, and that such bleeding out was further suppressed by using (A3) the polyacetal block copolymer 1. It was also found that, in contrast, the amount of a sliding agent that was present close to the surface layer of the molded article was largest in the case of using (A3) the polyacetal block copolymer 1 (i.e., the peak intensity ratio (C—O/C=O) was low).

As described above, it was found that the relative element concentration ratio (C/O) and the peak intensity ratio (C—O/C=O) have an influence on sliding characteristics. Moreover, it was also found that more excellent characteristics can be obtained by using (A3) the polyacetal block copolymer 1.

Furthermore, from a comparison made among Examples 5 to 7, it could be confirmed that a change in properties was caused by a difference in the types of coloring agents. It was found that although a significant change was not observed in the bleeding out of a sliding agent by a difference in the types of coloring agents (i.e., the relative element concentration ratio C/O was identical), there was a difference in the amount of a sliding agent present close to the surface layer of the molded article (i.e., the peak intensity ratio was different). That is to say, these results suggest that the abundance of the sliding agent present close to the surface layer of the molded article has been increased by using a coloring agent, in which the abundance of particles having a small circle equivalent particle diameter and a major axis of 10 μm or more was low. From these results, the improvement of the sliding properties of the molded article could be confirmed.

Examples 9 and 10, and Comparative Example 1

Molded bodies were produced in the same manner as in Example 1 with the exception that individual components were mixed with one another at the ratio shown in Table 2, and the produced molded bodies were then measured in terms of individual evaluation items. It is to be noted that the bleed out test was also performed on the present four examples (Examples 6, 9 and 10, and Comparative Example 1).

TABLE 2

|  | Unit | Example 6 | Example 9 | Example 10 | Comparative Example 1 |
|---|---|---|---|---|---|
| A2 | Part by mass | 100 | 100 | 100 | 100 |
| B1 | Part by mass | 1 | | | |
| B2 | Part by mass | | 1 | | |
| B3 | Part by mass | | | 1 | |
| B4 | Part by mass | | | | 1 |
| C2 | Part by mass | 0.5 | 0.5 | 0.5 | 0.5 |
| Relative element concentration ratio C/O (atomic %) | [—] | 2.12 | 2.13 | 2.43 | 1.00 |

TABLE 2-continued

|  | Unit | Example 6 | Example 9 | Example 10 | Comparative Example 1 |
|---|---|---|---|---|---|
| Peak intensity ratio (C—O)/(C═O) | [—] | 115 | 130 | 103 | 360 |
| Abrasion loss: very small load sliding test | μm² | 63 | 100 | 118 | 2300 |
| Abrasion loss: high load sliding test | μm | 8.5 | 7.2 | 8.5 | 4.1 |
| Adhesion of sliding agent to SUJ 2 ball after 10,000 times of sliding | μm | 5.5 | 8.5 | 4.6 | 0.5 or less |
| Amount of abrasion powder generated after 1,200,000 times of sliding | μm | AA | AA | AA | C |
| Bleed out test | Number of precipitates/cm² | Non | 1568 | 48 | Non |

A comparison was made among Examples 6, 9 and 10, and Comparative Example 1, in terms of a change in the types of sliding agents. In order to help understanding, the results of Example 6 are shown again in Table 2. It was found that the molded article of Comparative Example 1, in which the sliding agent (B4) having a molecular weight of more than 10,000 was used, had the same relative element concentration ratio C/O as that of polyacetal (which did not bleed out), and that the sliding agent component was hardly present close to the surface layer (i.e., a high peak intensity ratio). This is considered because the dispersed state of the component B4 was not good, and also because the melting point of the component B4 was high (154° C.). With regard to the molded bodies of the examples, in which the component B1 to the component B3 were used, there were no problems regarding sliding properties. Regarding the molded article of Example 9, in which the component B2, ethylenebis stearic acid amide was used, bleeding out was confirmed in the bleed out test. This is considered because of the hydrophilicity of the amide-based compound.

Examples 11 and 12, and Comparative Examples 2 to 5

Molded bodies were produced in the same manner as in Example 1 with the exception that individual components were mixed with one another at the ratio shown in Table 3, and the produced molded bodies were then measured in terms of individual evaluation items.

From a comparison made among Example 8 and Comparative Examples 2 and 3, the influence by a change in the amount of the sliding agent component could be confirmed. In order to help understanding, the results of Example 8 are shown again in Table 3. In addition, from a comparison made among Examples 11 and 12 and Comparative Examples 4 and 5, the influence by a change in the amount of the coloring agent could be confirmed. The results of the comparison made among Example 8 and Comparative Examples 2 and 3 suggest that sliding characteristics are rapidly improved if the amount of the sliding agent is within the range of the present embodiment, and suppression of the abrasion loss could also be confirmed. Moreover, from the comparison made among Examples 11 and 12 and Comparative Examples 4 and 5, it was found that when the amount of the coloring agent is within the range of the present embodiment, sliding properties are significantly improved as well. Furthermore, it was also found that the relative element concentration ratio C/O has been decreased (suppression of bleeding out) by an increase in the amount of the coloring agent. These results suggest that the action of the coloring agent has made it difficult for the sliding agent to bleed out on the surface layer.

Examples 13 to 15

Molded bodies were produced in the same manner as in Example 1 with the exception that individual components were mixed with one another at the ratio shown in Table 4, and the produced molded bodies were then measured in terms of individual evaluation items.

TABLE 3

|  | Unit | Comparative Example 2 | Example 8 | Comparative Example 3 | Comparative Example 4 | Example 11 | Example 12 | Comparative Example 5 |
|---|---|---|---|---|---|---|---|---|
| A3 | Part by mass | 100 | 100 | 100 | 100 | 100 | 100 | 100 |
| B1 | Part by mass | 0.05 | 1 | 6 | 1.2 | 1.2 | 1.2 | 1.2 |
| C2 | Part by mass | 0.5 | 0.5 | 0.5 | 0.005 | 0.02 | 2.5 | 3.2 |
| Relative element concentration ratio C/O (atomic %) | [—] | 1.00 | 1.22 | 2.68 | 2.53 | 2.50 | 1.08 | 1.10 |
| Peak intensity ratio (C—O)/(C═O) | [—] | 230 | 52 | 8 | 63 | 265 | 56 | 43 |
| Abrasion loss: very small load sliding test | μm² | 768 | 35 | Layer peeling | 368 | 285 | 25 | 345 |
| Abrasion loss: high load sliding test | μm | 16.6 | 5.2 | 18.7 | 11.9 | 10.5 | 11.8 | 19.0 |
| Adhesion of sliding agent to SUJ 2 ball after 10,000 times of sliding | μm | 0.5 or less | 0.5 or less | 10 or more | 3.6 | 1.6 | 0.8 | 0.7 |
| Amount of abrasion powder generated after 1,200,000 times of sliding | μm | C | AAA | C | C | B | A | C |

TABLE 4

|  | Unit | Example 13 | Example 14 | Example 15 |
|---|---|---|---|---|
| A3 | Part by mass | 100 |  | 100 |
| A4 | Part by mass |  | 100 |  |
| B1 | Part by mass | 2 | 2 | 2 |
| C2 | Part by mass | 0.5 | 0.5 | 0.5 |
| D1 | Part by mass |  |  | 3 |
| Relative element concentration ratio C/O (atomic %) | [—] | 1.18 | 1.08 | 1.10 |
| Peak intensity ratio (C—O)/(C=O) | [—] | 44 | 38 | 42 |
| Abrasion loss: very small load sliding test | μm$^2$ | 8 | 7 | 5 |
| Abrasion loss: high load sliding test | μm | 9.8 | 7.5 | 3.1 |
| Adhesion of sliding agent to SUJ 2 ball after 10,000 times of sliding | μm | 0.5 or less | 0.5 or less | 0.5 or less |
| Amount of abrasion powder generated after 1,200,000 times of sliding | μm | AAA | AAA | AAA |

From a comparison made among Examples 13 to 15, the influence by a change in the type of the polyacetal resin, and the influence by addition of polyolefin as an additional component could be confirmed. It was found that a molded article, in which (A4) the polyacetal block copolymer 2 comprising a large amount of block component was used as a polyacetal resin, had a more stable surface condition, and thus was excellent in terms of sliding characteristics. Moreover, in the case of the molded article of Example 15, in which polyolefin was used as an additional component, not only the abrasion loss in the very small load sliding test, but also the abrasion loss in the high load sliding test was drastically improved, and thus, it was found that the abrasion losses under the two types of conditions could be simultaneously improved.

Examples 16 to 18, and Comparative Examples 6 and 7

Individual components were mixed with one another at the ratio shown in Table 5, and the molded bodies obtained under the molding conditions shown in Table 5 were then measured in terms of individual evaluation items in the same manner as in Example 1. Regarding Example 13, a molded article was produced in the same manner as in Example 1 with the exception that individual components were mixed with one another at the ratio shown in Table 5, and the produced molded article was then used in evaluation. Moreover, regarding Example 16, a lamp-shaped test piece was produced according to the above procedure described [3] Molding processing (production of lamp-shaped molded article using injection molding machine), and was then used in evaluation. Furthermore, regarding Comparative Example 6 and Example 17, molded bodies were produced under conditions of 80° C. of a mold temperature in the above manner described in [2] Molding processing (production of multi-purpose test piece-shaped molded article using injection molding machine), and were then used in evaluation. Further, regarding Comparative Example 7 and Example 18, molded bodies were produced in the manner described [4] Molding method involving instantaneous heating of mold surface, and were then used in evaluation.

TABLE 5

|  |  | Example 5 | Example 16 | Comparative Example 6 | Comparative Example 7 | Example 13 | Example 17 | Example 18 |
|---|---|---|---|---|---|---|---|---|
| Molding method |  | [2] | [3] | [2] | [4] | [2] | [2] | [4] |
| Mold temperature |  | 30° C. | | 80° C. | | 30° C. | 80° C. | |
| A2 | Part by mass | 100 | 100 | 100 | 100 |  |  |  |
| A3 | Part by mass |  |  |  |  | 100 | 100 | 100 |
| B1 | Part by mass | 1 | 1 | 1 | 1 | 2 | 2 | 2 |
| C1 | Part by mass | 0.5 | 0.5 | 0.5 | 0.5 |  |  |  |
| C2 | Part by mass |  |  |  |  | 0.5 | 0.5 | 0.5 |
| Relative element concentration ratio C/O (atomic %) | [—] | 2.13 | 1.98 | 2.51 | 3.25 | 1.18 | 1.25 | 1.38 |
| Peak intensity ratio (C—O)/(C=O) | [—] | 145 | 129 | 210 | 245 | 44 | 65 | 95 |
| Abrasion loss: very small load sliding test | μm$^2$ | 96 | 64 | 182 | 342 | 8 | 11 | 19 |
| Abrasion loss: high load sliding test | μm | 9.8 | — | 14.2 | 10.8 | 9.8 | 4.5 | 6.3 |
| Adhesion of sliding agent to SUJ 2 ball after 10,000 times of sliding | μm | 5.9 | 5.6 | 10.5 | 15.3 | 0.5 or less | 0.5 or less | 0.5 or less |

TABLE 5-continued

|  |  | Example 5 | Example 16 | Comparative Example 6 | Comparative Example 7 | Example 13 | Example 17 | Example 18 |
|---|---|---|---|---|---|---|---|---|
| Amount of abrasion powder generated after 1,200,000 times of sliding | μm | A | A | B | C | AAA | AAA | AAA |

From a comparison made among Examples 5 and 16 and Comparative Examples 6 and 7 (the results of Example 5 are shown again in Table 5), it was found that a difference in molding methods, in particular, a mold temperature has an influence on the surface of a molded article, and also that properties are largely changed by a difference in the thickness of the sliding portion of a molded article. It was found that a molded article obtained by common injection molding at 30° C. had relatively high sliding properties, but that another molded article obtained by a molding method causing a small skin layer around the surface of the molded article (e.g., thickness molding using a high-temperature mold, or a molding involving instantaneous heating of mold surface) had significantly poor sliding properties.

Moreover, also from a comparison made among Examples 13, 17 and 18 (the results of Example 13 are shown again in Table 5), the same tendency as described above was confirmed. It was found that the sliding properties of a molded article are greatly influenced by a difference in the molding conditions.

From these comparisons, it has become clear that the sliding properties under a very small load are largely changed by the value of the relative element concentration ratio C/O that indicates the surface properties of a molded article.

INDUSTRIAL APPLICABILITY

The resin molded article of the present invention can be applied, not only to hard disk lamp components, internal components for watches or the like, etc., which are required to have abrasion resistance under a very small load, but also to various intended uses, to which polyacetal has been preferably used so far. Thus, the resin molded article of the present invention has high industrial applicability.

The invention claimed is:

1. A resin molded article comprising (B) 0.1 to 5 parts by mass of a sliding agent having a weight average molecular weight of 10,000 or less and a melting point of 40° C. to 150° C. and (C) 0.01 to 3 parts by mass of a coloring agent, based on (A) 100 parts by mass of a polyacetal resin, wherein a relative element concentration ratio between carbon and oxygen [C/O] (atomic %) on a surface of the resin molded article is 1.01 to 2.50, wherein a peak intensity ratio (C—O/C=O) between a C—O stretching vibration peak and a C=O stretching vibration peak on the surface thereof, which is obtained by infrared spectroscopy, is 10 to 200.

2. The resin molded article according to claim 1, wherein (A) the polyacetal resin comprises a block copolymer.

3. The resin molded article according to claim 2, wherein the block copolymer is an ABA-based block copolymer, in which a polyacetal segment A and a hydrogenated polybutadiene segment B, both termini of which are hydroxyalkylated, are configured in the order of A-B-A.

4. The resin molded article according to claim 1, wherein (B) the sliding agent having the weight average molecular weight of 10,000 or less is at least one compound selected from the group consisting of alcohol, amine, carboxylic acid, an ester, an amide compound consisting of monovalent or divalent amine and carboxylic acid, and wax.

5. The resin molded article according to claim 1, wherein (C) the coloring agent comprises at least one metal oxide selected from the group consisting of iron, zinc, and titanium.

6. The resin molded article according to claim 1, further comprising (D) 0.01 to 5 parts by mass of a polyolefin resin based on (A) 100 parts by mass of the polyacetal resin.

7. The resin molded article according to claim 6, wherein (D) the polyolefin resin is at least one selected from the group consisting of (i) polyethylene, (ii) polypropylene, (iii) an ethylene-α-olefin copolymer, (iv) an ethylene-acrylic acid ester copolymer in which the content of the acrylic acid ester unit is 5% to 30% by mass, (v) a block polymer having a structure in which a block of polyolefin (d1) and a block of a hydrophilic polymer (d2) are repeatedly and alternatively bound to one another via at least one bond selected from the group consisting of an ester bond, an amide bond, an ether bond, a urethane bond, and an imide bond, and (vi) a modified product thereof.

8. The resin molded article according to claim 1, wherein
(A) the polyacetal resin comprises a block copolymer,
(B) the sliding agent having the weight average molecular weight of 10,000 or less is at least one compound selected from the group consisting of alcohol, amine, carboxylic acid, an ester, an amide compound consisting of monovalent or divalent amine and carboxylic acid, and wax, and
(C) the coloring agent comprises at least one metal oxide selected form the group consisting of iron, zinc, and titanium.

* * * * *